US011120422B2

(12) United States Patent
Abdelkader

(10) Patent No.: US 11,120,422 B2
(45) Date of Patent: Sep. 14, 2021

(54) GEOFENCE-BASED LOCATION TRACKING AND NOTIFICATION TRIGGERING SYSTEM

(71) Applicant: GPS SPECIAL.COM LLC, Clearwater Beach, FL (US)

(72) Inventor: Abdelgawa Abdelkader, Clearwater, FL (US)

(73) Assignee: GPS Special.com LLC, Clearwater Beach, FL (US)

( * ) Notice: Subject to any disclaimer, the term of this patent is extended or adjusted under 35 U.S.C. 154(b) by 52 days.

(21) Appl. No.: 16/445,047

(22) Filed: Jun. 18, 2019

(65) Prior Publication Data

US 2019/0385145 A1 Dec. 19, 2019

Related U.S. Application Data

(60) Provisional application No. 62/687,106, filed on Jun. 19, 2018.

(51) Int. Cl.
*G06Q 20/32* (2012.01)
*G06Q 20/40* (2012.01)
(Continued)

(52) U.S. Cl.
CPC ..... *G06Q 20/3224* (2013.01); *G06Q 20/3255* (2013.01); *G06Q 20/3274* (2013.01);
(Continued)

(58) Field of Classification Search
CPC .................................................. G06Q 20/3224
(Continued)

(56) References Cited

U.S. PATENT DOCUMENTS 8,720,771 B2 5/2014 MacKinnon
9,195,989 B2 11/2015 Bosworth et al.
(Continued)

FOREIGN PATENT DOCUMENTS

WO WO 2014/206627 A1 12/2014
WO WO 2015/084465 A1 6/2015

OTHER PUBLICATIONS

International Search Report and Written Opinion for International Application No. PCT/US2019/037756 dated Sep. 4, 2019.
(Continued)

*Primary Examiner* — Alexander G Kalinowski
*Assistant Examiner* — Paul R Kloberg
(74) *Attorney, Agent, or Firm* — Knobbe, Martens, Olson & Bear, LLP

(57) ABSTRACT

Systems and methods are disclosed for a geofence-based location tracking and notification triggering system. One of the methods includes obtaining location information associated with a user device; accessing information indicating entities located within one or more threshold distances of the obtained location; determining whether a user of the user device satisfies constraints specified by the entities; and generating a notification to be provided to the user device, the notification indicating information associated with at least one entity for which the user satisfies specified constraints. Preferably, the notification is in the form of a text messages, which provides advantages for real-time notifications with increased spatial relevance to a user.

16 Claims, 16 Drawing Sheets

(51) Int. Cl.
 *H04W 4/029* (2018.01)
 *H04W 4/02* (2018.01)
 *H04W 4/021* (2018.01)
 *H04W 4/12* (2009.01)
 *G06Q 30/02* (2012.01)
(52) U.S. Cl.
 CPC ......... *G06Q 20/40* (2013.01); *G06Q 30/0222* (2013.01); *H04W 4/021* (2013.01); *H04W 4/023* (2013.01); *H04W 4/029* (2018.02); *H04W 4/12* (2013.01)
(58) Field of Classification Search
 USPC .......................................................... 705/41
 See application file for complete search history.

(56) References Cited

U.S. PATENT DOCUMENTS

| | | | |
|---|---|---|---|
| 9,324,091 B2 * | 4/2016 | Randell | G06Q 30/0235 |
| 9,504,004 B1 * | 11/2016 | Auvenshine | H04W 4/029 |
| 9,756,474 B1 * | 9/2017 | Knas | H04W 4/14 |
| 9,996,816 B2 | 6/2018 | Song et al. | |
| 10,096,043 B2 | 10/2018 | Beck et al. | |
| 10,229,434 B2 | 3/2019 | Cheng et al. | |
| 10,491,709 B2 * | 11/2019 | Williams | G06Q 30/0251 |
| 2004/0243519 A1 | 12/2004 | Pertilla et al. | |
| 2008/0133366 A1 | 6/2008 | Evans et al. | |
| 2009/0307067 A1 | 12/2009 | Obermeyer | |
| 2011/0238476 A1 | 9/2011 | Carr et al. | |
| 2011/0251962 A1 | 10/2011 | Hruska | |
| 2012/0084122 A1 | 4/2012 | Boehla | |
| 2012/0316939 A1 | 12/2012 | Moshfeghi | |
| 2013/0024371 A1 * | 1/2013 | Hariramani | G06Q 20/384 |
| | | | 705/41 |
| 2013/0041761 A1 | 2/2013 | Voda | |
| 2013/0046595 A1 | 2/2013 | Wu et al. | |
| 2013/0060637 A1 | 3/2013 | Walker et al. | |
| 2014/0058815 A1 | 2/2014 | Hiremath et al. | |
| 2014/0292511 A1 | 10/2014 | Sheha et al. | |
| 2014/0368601 A1 * | 12/2014 | deCharms | H04L 67/26 |
| | | | 348/14.02 |
| 2015/0012426 A1 * | 1/2015 | Purves | G06Q 20/321 |
| | | | 705/41 |
| 2015/0088607 A1 | 3/2015 | Georgoff et al. | |
| 2015/0161643 A1 * | 6/2015 | Randell | G06Q 20/0457 |
| | | | 705/14.26 |
| 2015/0178784 A1 | 6/2015 | Oliver et al. | |
| 2015/0254704 A1 | 9/2015 | Kothe et al. | |
| 2016/0132921 A1 | 5/2016 | Martinez et al. | |
| 2016/0357782 A1 | 12/2016 | Jones | |
| 2016/0364744 A1 | 12/2016 | Stone et al. | |
| 2016/0371668 A1 | 12/2016 | Priebatsch et al. | |
| 2018/0040012 A1 | 2/2018 | Lin | |
| 2019/0034921 A1 | 1/2019 | Hammad et al. | |
| 2019/0087847 A1 | 3/2019 | Peasley et al. | |
| 2019/0370861 A1 | 12/2019 | Artman et al. | |

OTHER PUBLICATIONS

Little Internet Pvt Ltd., Screenshots for Little App from the Google Play Store, Oct. 30, 2015.

* cited by examiner

GEOFENCE-BASED LOCATION TRACKING AND NOTIFICATION TRIGGERING SYSTEM

CROSS-REFERENCE TO RELATED APPLICATIONS

This application claims priority to U.S. Prov. App. No. 62/687,106 filed on Jun. 19, 2018. U.S. Prov. App. No. 62/687,106 is hereby incorporated herein by reference in its entirety.

TECHNICAL FIELD

The present disclosure relates to systems and methods for location tracking, data integration, and visualization. More specifically, this disclosure relates to systems and methods for monitoring user device locations and triggering notifications to user devices.

BACKGROUND

User devices, including portable electronics such as smart phones or tablets, commonly enable a determination as to their location. For example, a smart phone may include a global navigation satellite system (GNSS) receiver which can map the smart phone onto specific coordinates on Earth (e.g., WGS84, EGM96, EGM2008, and so on). Applications executing on a smart phone, for example applications obtained from an electronic application store, may utilize the smart phone's location to perform various functions. For example, a first application may provide directions to a user of the smart phone. A second example application may identify locations of users that are proximate to a user of the smart phone.

Furthermore, a geofence may be established for a particular geographic area and actions may be taken in response to user devices entering or exiting the geofences. It will be appreciated that a geofence may be defined as a virtual perimeter for a real-world geographic area. A geofence may be a particular shape, such as a polygon or oval, and a geofenced may therefore encompass locations within the geofence. With respect to the first example application described above, a parent may establish a geofence for his/her child. If the child's smart phone is detected as being located outside the geofence, the parent may be notified. In this way, location tracking features of user devices may be leveraged to improve user experiences of different applications.

Accordingly, there is ongoing development in applications which take advantage of location tracking in conjunction with geofencing.

SUMMARY

As will be described in more detail, applications and systems that link users and entities, such as restaurants, can be improved via the techniques described herein. For example, multitudes of entities spread throughout different geographic areas may offer user-selectable options to engage in a transaction, e.g., deals. In contrast to prior applications and technical schemes, the techniques described herein may enable a holistic application platform that addresses technological shortcomings of prior applications. As an example, via the techniques described herein an entity (e.g., a business, such as a restaurant or store) may utilize user interfaces designed to enable the rapid indication of deals the entity is offering. A user may utilize an application executing on the user's user device (e.g., smart phone) to view deals located within a threshold distance of their present, real-time, location. As will be described, the user may utilize the user device to select a particular deal, and an example system described herein may cause completion of a transaction associated with the particular deal with minimal user input. In this way, the user may easily and quickly utilize the particular deal at an associated entity. For example, authentication information such as a QR code may be automatically obtained by the user's user device, and the user may present the QR code to a system or device associated with the entity as confirmation that the user is authorized to receive a selected deal. It will be appreciated that references to QR code herein are made for convenience. Any other information suitable for unique identification of an authorized selected deal (e.g. a deal for which payment was completed) may be utilized. Preferably, the codes may be read by an optical scanner, such as a phone camera.

Thus, the example system can enable entities to create listings that indicate deals the entities are offering. The system can enable users of user devices to select deals of interest to the users, and then utilize the selected deals. As described herein, selecting a deal may include purchasing the deal or otherwise performing a transaction such that a user may utilize the selected deal at an associated entity. For example, an entity may indicate a deal offering a discount on dinner at a certain time. A user may view information describing the deal, for example in an interactive user interface or in a text message and may select the deal. Subsequently, the user may obtain authorization information enabling utilization of the selected deal. As an example, authorization information may include a QR code as described above. The user may present the QR code to the entity and obtain the discounted dinner. As another example, the user may confirm his/her identity via biometric authentication, and the user's user device may provide the authorization information (e.g., via near field communications, Bluetooth, and so on) to a device or system associated with the entity. The user may similarly then obtain the discounted dinner.

Advantageously, the techniques described herein may (1) enable a user device to receive notifications regarding deals proximate to the user device's location, (2) cause selection of a particular deal without requiring a specific application be installed on the user device, and/or (3) allow subsequent redemption of that deal by another device without requiring a specific application be installed on that other device. As an example, smart phones may generally require the downloading and installation of electronic applications. To download these applications, a user may be required to consume cellular bandwidth. Subsequently, the user may be required to generate a user profile, create a user name and password, and so on. In contrast, an example scheme described herein may enable utilization of the user device's built in messaging application to perform complex functionality. For example, the user device may receive one or more texts (e.g., Short Message Service or Multimedia Messaging Service texts) indicating deals proximate to the user. Via interaction with the text, the user may enable selection of a particular deal for utilization at an entity associated with the particular deal. For example, the user may respond to the received one or more texts with input indicating that the user prefers selecting the deal (e.g., providing a "buy" input, optionally using a unique code associated with the user). Upon selection of the deal, the system may automatically validate the selection, and trigger an authentication code, e.g. a QR code, to be provided as a text to the user device. The authentication code may be used by the user device or forwarded to a second user device. The user device, or the second user device receiving the authentication code, may therefore utilize the selected deal. Advantageously, this use may be enabled without the constraint of downloading a specific application and/or creating a user profile associated with an application.

As will be described, bonus information (e.g., bonus points) may be assigned, or otherwise made accessible, to a user based on the user's interaction with the techniques described herein. For example, the user may receive a particular quantity of bonus points upon receipt of notifications, such as text messages. These bonus points may be usable (e.g., exchangeable) by the user when selecting deals. That is, in exchange for a portion of the user's cellular data, or use of the user's text messages (which may be limited), the user may be assigned bonus points. In this way the user may be incentivized to receive (e.g., authorize receipt of) the notifications described herein.

It should be appreciated that disparate applications executing on a user device may all vie for attention of a user, but certain applications may be more frequently accessed by or garner greater attention from a user. For example, and as is known in the art, an application may routinely trigger notifications for presentation on the user device to increase interactivity with the application. This technical environment may cause users to ignore such notifications, or to limit the application's ability to present notifications via adjustment of operating system parameters. Similarly, users may experience application fatigue due to the large quantity of applications available to them. Thus, an example scheme described herein may intelligently leverage the technical features included in modern day user devices without requiring specific interaction with an application specific to receiving a deal. In addition, notifications that are provided for deals may utilize text applications, for which users may pay greater attention.

With respect to the above described example of a user receiving a text on the user's user device describing an available deal, the user may simply interact with a text application (rather than a deal-specific application) and respond to a text indicating selection of the available deal. Subsequently, the user may receive a text with an image of a QR code configured to confirm to an entity that the user may utilize the selected deal. Via the user's responding to the text, payment may be automatically handled. For example, the user may have automatic digital payment functionality built-into his/her user device, or have an application associated with such payments installed on his/her device. These applications may be leveraged to provide payment to the entity.

As will be described, a first user may utilize a user interface to browse deals available anywhere in the world, and then cause sharing of a selected deal with a second user. For example, the first user may select a particular deal at a particular entity and cause the particular deal to be automatically enabled for utilization by the second user. As an example, the second user may be visiting a new city, and the first user may select the deal (e.g., a dinner, a drink, and so on) for the second user to utilize. In this example, the first user may optionally use an application to view available deals in the new city. Via the improved techniques described herein, the second user may simply receive a notification on his/her user device indicating the selected deal. The second user may then access an automatically obtained QR code and present the QR code at the particular entity. For example, the particular entity may utilize an application to scan the QR code. Advantageously, and as described herein, the application may be the same application used by the first user to select the deal. For example, the application may be associated with use by both end-users and entities that offer deals. In some embodiments, the application may include a toggle to switch between use by an end-user and use by an entity. Furthermore, an entity may enable its users (e.g., employees) to be assigned authorization to scan QR codes.

In this way, the above-described second user may utilize the selected deal to obtain the dinner, drink, and so on. In the above-described example, the second user may utilize the QR code without having to install an application. For example, the first user may optionally utilize an application to browse and select deals. Upon receipt of a QR code, the first user may transmit (e.g., via text) the QR code to the second user. In this way, the second user may enjoy the benefit of the deal without any specialized application. Furthermore, the QR code may be unusable after the use by the second user. For example, after the QR code is canned and the deal redeemed, a system described herein may store information indicating the redemption. Thus, a unique identifier associated with the QR code may be updated to reflect that it has been used. In this way, if the QR code is scanned again the system may reject the associated deal being redeemed again.

An entity may establish rules associated with triggering notifications to user devices located proximate to the entity. For example, the entity may cause generation of a geofence to surround their location, and a system described herein may monitor user devices that enter and/or exit the geofence. The system may automatically trigger a notification (e.g., text notifications, application-based notifications, and so on) to a user device describing available deals of an entity based on the user device entering a particular geofence associated with the entity. Thus, the system described herein may utilize technical characteristics inherent in current user devices, such as Global Navigation Satellite System receivers, to cause a linking between an entity and a user device located proximate to the entity.

In addition to the above-described functionality, the technical improvements described herein may leverage improved user interfaces. As an example, specific user interfaces are described herein that may, among other things, simplify processes to perform actions. An example action may include user selection of a particular deal located proximate to the user. Another example action may include sharing a selected deal with another user, and through limited user input, enable the other user to utilize the selected deal. As another example, specific user interfaces may be utilized by an entity to view real-time updates of users (e.g., anonymized users) located proximate to the entity. The entity may then trigger notifications to be provided to the users, or to specific users. For example, the specific users may have user profile information that satisfies constraints or conditions established by the entity. An example of a user interface to trigger notifications, such as text messages or application-based messages, is illustrated in FIG. 3B.

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

This specification describes a system (e.g., the location analysis system 100) that can enable entities to establish deals available for selection by users, and then enable users to view and/or select established deals. As will be described, the system may interact with one or more applications executing on user devices of entities or users. For example, the application may be obtained from an electronic application store (e.g., an "app"), and may be in communication with the system via one or more networks.

Figure 2:
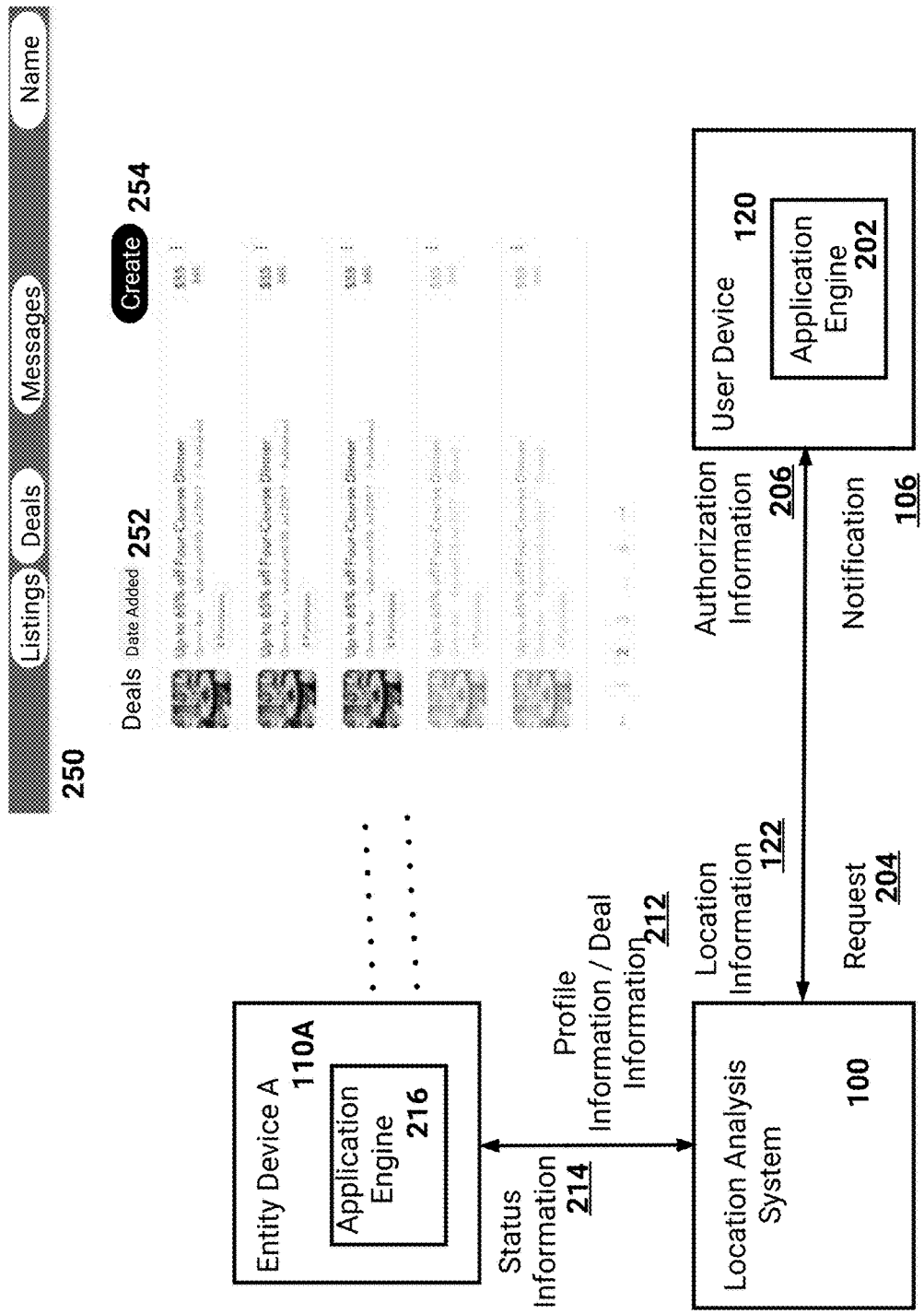
FIG. 2 illustrates an example block diagram of a location analysis system in communication with an example entity device and an example user device.

An entity, as described herein, may include any business, company, and/or user with offers (deals) related to goods, products, services, and so on. For example, an entity may be a provider of an offering associated with a deal. An example entity may include a restaurant, and an example deal may include a particular dinner. The example deal may represent a reduction in cost from a normal amount, and the entity may offer the example deal for a limited time and/or only to specific users (e.g., a specific number of users). Another example entity may include a masseuse, and an example deal may include a massage. As will be described below, the entity may utilize user interfaces to create specific deals for storage by the system. For example, FIG. 2 illustrates an example user interface 250 associated with creation of one or more deals. Each created deal may describe particular aspects, such as an indication of what is being offered (e.g., a dinner, details related to the dinner, and so on), a cost associated with the deal, a location and/or description of the entity offering the created deal, an expiration date associated with the deal, and so on. The system may then notify users of the deals and/or enable selection of deals.

With respect to notifying users, the system may obtain (e.g., periodically obtain) location information associated with user devices. For example, location information may be obtained based on opt-in authorization information provided by users of the user devices. Location information may include global positioning system (GPS) coordinates, address information, and so on. The system may compare the location information to locations associated with entities (e.g., respective addresses or GPS coordinates), and may notify users who are located within a threshold distance of at least one entity. As an example, the system may enable each entity to specify a geofence surrounding the entity for which users will be notified of deals associated with the entity. An example geofence may be specified as a radius surrounding the entity. In this way, as a user device of a user is detected as entering an example geofence, the system may trigger one or more notifications to the user device describing available deals associated with the entity.

Advantageously, texts may be utilized as notifications. In contrast, prior technical schemes may lack text capability. For example, a web application-based scheme may require notifications to be provided via specific applications installed on user devices. Since users may ignore and/or disable these notifications, texting may provide a more established and assured method of providing the notifications. In addition, users are typically prone to opening texts as a matter of habit, which can increase the ability to provide notifications that are reviewed on a timely basis. Thus, texts may optionally be utilized as notifications. A text may inform a user of succinct information related to a particular deal located proximate to the user's user device. For example, the text may indicate a name of the entity, what is being offered via the particular deal, a cost associated with the particular deal, and so on. The text may include one or more links that enable selection (e.g., purchase) of the particular deal. It may be appreciated that other selectable elements may be used and fall within the scope of the disclosure herein. As an example, upon selection of a link the user's user device may cause activation of an application executing on the user device that is associated with the system. As another example, upon selection of a link the user's user device may cause navigation to a web page associated with the system. In these examples, information describing particular deal may be presented. For example, details of the particular deal (e.g., name of the entity, description of the deal, cost, location of the entity, and any other constraints or information).

In some embodiments, the user may select (e.g., purchase) the above-described particular deal via responding to the received text. For example, the user may enter text such as "buy", "purchase", and so on. In this example, the user may additionally specify a unique code or password associated with the user. In some embodiments, the unique code or password may vary based on time. For example, an application (e.g., Authy) may generate unique codes which are valid for a particular time period. The system described herein may then enable the particular deal to be selected (e.g., purchased).

In addition to the system automatically triggering notifications based on a user device's location, notifications may also be triggered by an entity (e.g., a user associated with the entity, also referred to as an entity user). For example, an entity user may access an entity user interface and view users (e.g., in real-time or substantially real-time) who are located within a threshold distance of the entity. The entity user interface may optionally present information associated with each user, such as the user's preferences (e.g., types of deals previously selected by the user). The entity may then cause notifications to be provided to specific third-party users. For example, the notifications may be provided as text messages or as notifications associated with an application executing on user devices of the third-party users. Particular third-party user information, such as their name, may optionally be hidden from the entity. Instead, third-party user preference information may be presented, such that the entity may solely notify third-party users who are likely to be interested in a deal. Optionally, the system may analyze third-party user preference information (e.g., via one or more machine learning models, such as k-means clustering algorithms), and automatically notify third-party users who are likely to be interested in a deal.

A user device may receive a notification, for example provided from the location analysis system or from an outside system responsive to instructions from the system, and may present the notification to an associated user. As described above, the user may interact with the notification to cause selection (e.g., purchase) of a deal associated with the notification. Upon selection, the system may generate authorization information to be provided to the user device. Example authorization information may include a barcode (e.g., a QR code) or other graphical representation, encrypted information (e.g., information generated via a private key associated with the system), and so on. To redeem (e.g., utilize) the deal, the user may cause presentation of the authorization information to a device or system associated with the entity. For example, the user may cause presentation of a QR code, and a device or system associated with the entity may analyze the QR code to confirm the authorization. In this example, the device or system may perform an optical recognition process on the QR code or other graphical representation. In this example, the device or system may execute an application described herein which may enable users to select and/or view available deals and also enable users associated with the entity to scan and/or redeem QR codes or other authorization information. As another example, the user may cause transfer of the authorization information to a device or system associated with the entity. The device or system may then determine whether the authorization information is associated with the system (e.g., utilizing a public key associated with the system to verify a signature). Additionally, the authorization information may be provided to the system via a network (e.g., the internet), and the system may provide a response associated with validating the information.

As will be described, for example with respect to FIGS. 5A-5C, a user device may additionally present deals available for selection in a geographic area. For example, the user device may present a user interface that includes a map of a geographic area in which the user device is located. The user interface may be presented (e.g., rendered) by an application (e.g., mobile application, web application, and so on) executing on the user device. The map may indicate locations of deals optionally along with summary information associated with each deal. The user may optionally specify types of deals of interest to the user. For example, the user can specify that only deals at restaurants are of interest. The user interface may respond to user input from the user associated with selecting a deal. As described above, upon selection of a deal the user device may obtain authorization information to confirm the user's authorization to utilize the selected deal.

Furthermore, utilizing the user interfaces described herein, a first user can select a deal, and can cause the deal to be shared with (e.g., provided to) a second user. As will be described below, the user actions or input required to share the deal may be reduced based on the techniques described herein. For example, the first user may browse deals associated with entities located within a threshold distance of the second user. As another example, the first user may browse deals associated with an entity at which the second user is located. In this example, the system may obtain the second user's location and identify an entity associated with the location. Optionally, to increase privacy the system may hide a name of the entity and present information identifying deals associated with the entity. The first user may select the deal, and via a user interface indicate that the selected deal is to be shared with a second user. The system described herein may cause authorization information to be automatically provided to the second user. In this way, the second user may simply open up his/her user device and utilize the shared deal. For example, the second user may receive a QR code and present the QR code to a system or device associated with the entity. Advantageously, the second user may be located anywhere in the world. For example, the entity and the second user may be located in a different country than the first user.

Thus, the technical scheme described herein may improve upon prior applications or systems. For example, as described above prior applications may not enable notifications via text as described herein. Advantageously, text messages (or texts) utilize little bandwidth, which can allow deals to be presented even in areas with poor cellular/data reception, and allow highly dynamic real-time content to be presented. For example, it will be appreciated that other notifications (e.g., graphically intense notifications) may load more slowly, such that a moving user may be outside of a geofenced area by the time that a user receives the notification. Text messages, however, may be received more quickly, thereby allowing deals that are actually near a user's current location to be presented, rather than deals from an earlier time and location (due to lag in the time it may take for larger size messages to be completely received and presented to a user). Thus, the notifications presented to the user may have greater temporal and spatial relevance to the user, since, relative to higher bandwidth notifications, they may be received closer to the time and location that the user is at that particular location.

As another example, prior applications may not provide a platform that varies functionality according to a type of a user using the platform. As described above, entities may perform particular functionality such as creating deals, specifying rules associated with notifying users, and so on. Additionally, users may view deals, receive notifications, share selected deals, and so on. Thus, actions that may be performed by entities or users may be constrained. A same application may be utilized by an entity and user, and the application may be customized according to whether an entity or user is utilizing the application. In this way, the application may constrain presentation of information based on a type of a user, and a same application may be maintained, updated, and so on.

Reference will now be made to the drawings, in which like numerals refer to light parts throughout.

Figure 1A:
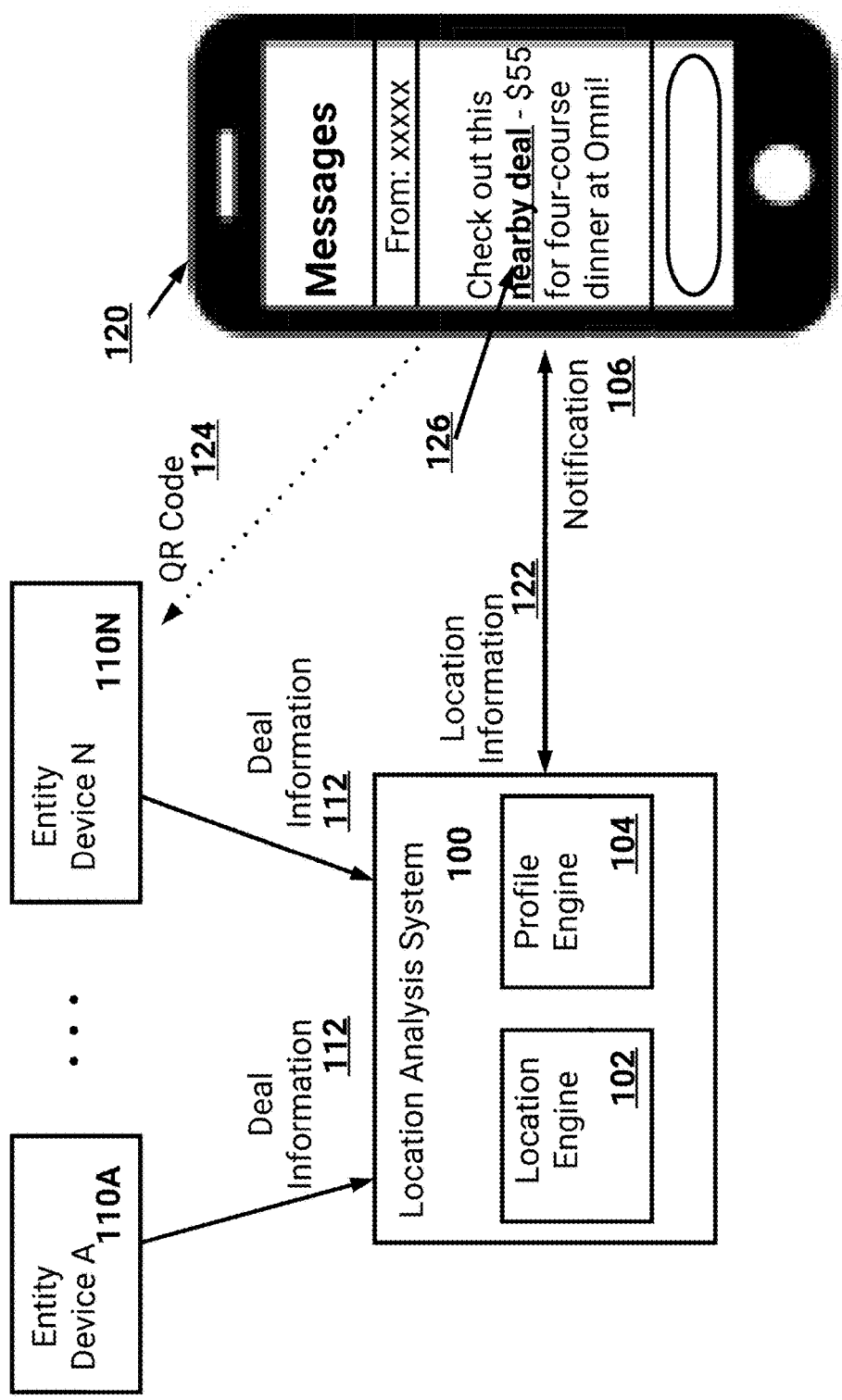
FIG. 1A illustrates an example block diagram for generating notifications regarding deals.

FIG. 1A illustrates an example block diagram for generating notifications regarding deals. As illustrated, a location analysis system 100 is in communication with entity devices A-N 110A-110N and a user device 120 (e.g., smart phone, tablet, wearable device) of a user. The location analysis system 100 may be an example of a system of one or more computers or one or more virtual machines executing on a system of one or more computers. The entity devices A-N 110A-110N may be systems or devices (e.g., tablets, smart phones, wearable devices, laptops, and so on) that are associated with respective entities. As described above, an entity may include a business associated with one or more deals available for selection by users.

The location analysis system 100 may receive information from, and provide information to, the entity devices A-N 110A-110N and user device 120. As will be described in more detail below, each entity device may utilize an application associated with the location analysis system 100. For example, entity device A 110A may execute an application obtained from an electronic application store. As another example, entity device A 110A may execute software configured to communicate with the location analysis system 100. As another example, entity device A 110A may present a web page generated, at least in part, by the location analysis system 100. In this example, the web page may be associated with a web application implemented by the location analysis system 100. In this way, the entity devices A-N 110A-110N may utilize user interfaces generated by the application, or presented via web pages, to create deal information 112. An example user interface associated with creating a deal is described below and illustrated in FIG. 7A.

As described above, deal information 112 may include information describing deals available for selection. For example, a particular deal may indicate goods, services, products, and so on that are being offered via the particular deal. As another example, the particular deal may indicate an associated cost. As another example, the particular deal may indicate a category associated with the particular deal (e.g., restaurant, bar, hotel, and so on). A user of entity device A 110A, for example, may therefore specify information related to one or more deals. The location analysis system 100 may store deal information 112 for the entity devices A-N 110A-110N, such that users may select deals for utilization.

The location analysis system 100 includes a location engine 102 that can obtain location information of user devices, and then identify whether a user device is located proximate to a location of an entity. For example, user device 120 is illustrated as providing location information 122 to the location analysis system 100. The location information 122 may be provided periodically (e.g., at regular intervals, such as every minute, every 10 minutes) by the user device 120, or based on satisfaction of one or more triggers. An example trigger may include the user device 120 being moved greater than a threshold distance. Another example trigger may include a velocity of the user device exceeding a threshold. For this example trigger, the user device 120 may provide location information 122 with a greater frequency. The location information 122 may be provided by an application executing on the user device 120. In this way, the location engine 102 may thus monitor locations of different user devices.

The location engine 102 can compare the obtained location information 122 to locations associated with entities. For example, the location engine 102 can identify an entity that is within a threshold distance of the user device 120. The threshold distance may optionally be specified by the entity. For example, a user of entity device A 110A may specify that an associated entity is interested in users who are within a four-block radius of the entity. As another example, the user of entity device A 110A may describe a geofence surrounding the entity. In this example, the user may optionally interact with a representation of a map to identify boundaries of the geofence. For example, the user may utilize a touch-sensitive display to sketch the boundaries of the geofence on the representation of the map.

Upon identifying one or more entities located with a threshold distance of user device 120, the location analysis system 100 may cause a notification 106 to be provided for presentation on the user device 120. The notification 106 may include information associated with an entity or deal offered by an entity. For example, the notification 106 may be a text. Optionally, the location analysis system 100 may provide multiple notifications to the user device if the user device 120 is located within a threshold distance of multiple entities. Optionally, the location analysis system 100 may select one entity of the multiple entities, and then provide a single notification 106 to the user device 120. The system 100 may then provide an additional notification after a threshold amount of time (e.g., 5 minutes, 7 minutes), or after the user device 120 has moved greater than a threshold distance (e.g., one block, two blocks, a quarter of a mile, a quarter of a kilometer, and so on). In some embodiments, the system 100 may constrain a number of notifications received by the user device 120. For example, as a user of the user device 120 changes his/her location (e.g., walks around) the system 100 may cause texts to be provided to the user device 120. In this example, the system 100 may limit a number of texts which are provided (e.g., 5, 10, 15). For example, the system 100 may provide up to a threshold number of texts while the user is located in a particular geofence or geographic region. As another example, the system 100 may provide a text associated with an entity no greater than a threshold amount of time (e.g., 5 minutes, one hour, and so on).

Optionally, the location analysis system 100 may select one entity of the multiple entities based on user preference information. For example, the system 100 may monitor deals a user of the user device 120 has selected in the past. As another example, the system 100 may utilize a time of day to inform the selection. For example, if a time of day is in the morning then the system 100 may discard deals associated with bars.

In the example of FIG. 1A, the user device 120 is presenting a text message that describes a nearby deal. The nearby deal indicates a location of an entity offering the deal (e.g., "Omni"), an offering associated with the nearby deal (e.g., four-course dinner), and a cost associated with the nearby deal (e.g., $55). A user of the user device 120 may interact with the text to select the nearby deal. For example, the text may include a link 126. Upon selection of the link 126 by the user, the user device 120 may provide information to the location analysis system 100 confirming the selection. Payment associated with the nearby deal may be automatically handled by the system 100. For example, the system 100 may have a payment instrument associated with the user, and may then charge the payment instrument. As another example, the user device 120 may include payment functionality and may confirm that the user is selecting the nearby deal. In this example, the user may provide biometric confirmation, such as fingerprint or face ID, and the payment may be processed by the user device 120. As another example, a user interface may be presented on the user device 120 to effectuate payment. For example, the application may present a payment screen. Optionally, the system 100 may provide a notification or otherwise transmit information to a system associated with an entity offering the deal.

Upon selection of the nearby deal, a QR code 124 may be provided to the user device 120 by the location analysis system 100. For example, the QR code 124 may be generated by the system 100 and may indicate information (e.g., encoded or encrypted information) confirming selection of the nearby deal. Optionally, the user device 120 may generate the QR code. For example, the user device 120 may execute an application, for example as described above, and the application may generate the QR code. In this example, the application may cause the user's payment instrument to be charged. The payment may be directed to an entity associated with the deal, and a system associated with the entity may optionally confirm receipt. Upon receipt of confirmation of payment, the application may generate a QR code that indicates information associated with the nearby deal. For example, the QR code may indicate a unique value associated with the nearby deal. The QR code may also indicate a unique value associated with the user of the user device 120. Upon selection of the nearby deal, the location analysis system 100 may store information identifying that the user selected the nearby deal.

An entity (e.g., via entity device N 110N) may obtain an image of the above-described QR code 124, and upon decoding the QR code provide the unique value to the system 100. Advantageously, the entity device N 110N may execute a same application as described above. The application may enable reading of the QR code 124, for example in some embodiments the application may be placed in a mode associated with use by an entity. The system 100 may then confirm whether the user associated with the unique value selected any deals associated with entity device N 110N. Upon a positive determination, the location analysis system 100 can provide a confirmation to entity device N 110N indicating the user is authorized to utilize the nearby deal. In this way, a user of user device 120 may receive the benefit of the nearby deal. The system 100 may additionally store information identifying that the deal has been used. Thus, the QR code 124 may be unable to be used again.

The location analysis system 100 further includes a profile engine 104 that can store profile information for entities and/or users. For example, the profile engine 104 may reflect all deals offered by an entity that have been selected by users. Additionally, the profile engine 104 may store detailed information related to an entity, such as name, location, type of goods or services offered, and so on. With respect to users, the profile engine 104 may reflect historical information associated with each user. For example, the profile engine 104 may store deals previously selected by a user, selected deals actually utilized by the user, deals that were provided as notifications to the user (e.g., and not selected), and so on. As another example, the profile engine 104 may store user preference information. User preference information may include types of deals of interest to a user, such as restaurant deals. Additionally, user preference information may include types of food of interest to the user, search queries entered by the user (e.g., as will be described below, with respect to FIGS. 5A-5C, users may search for specific deals), and so on. The profile information may be utilized by the location analysis system 100 to inform which notifications are provided to the user device 120, or to recommend users to specific entities who may be likely to select respective deals offered by the specific entities.

Figure 1B:
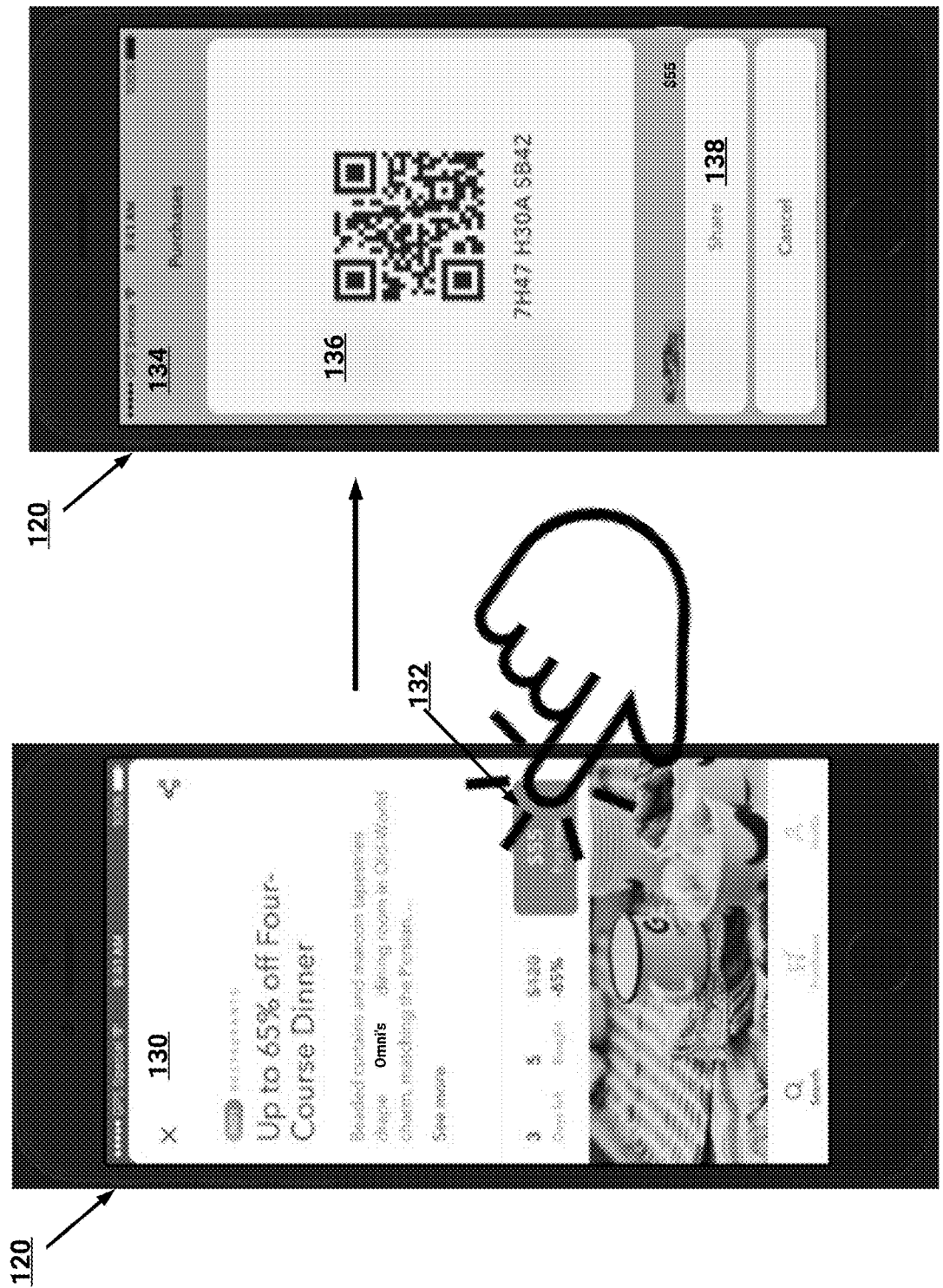
FIG. 1B illustrates example user interfaces for selecting a deal.

FIG. 1B illustrates example user interfaces 130, 134, for selecting a deal. As described above, with respect to FIG. 1A, a notification 106 may be provided to a user device 120 describing a nearby deal. In the example of FIG. 1A, the notification 106 is provided as a text. As another example, the notification 106 may be transmitted to the user device 120 as a message associated with an application executing on the user device 120. The notification 106 may therefore cause activation of the application, such that the application graphically illustrates the nearby deal.

In the example of FIG. 1B, user interface 130 may represent a notification 106 which causes activation of an application on the user device 120. The application may then present user interface 130 in response to the activation. Similar to the text presented on the user device 120 in FIG. 1A, user interface 130 describes information associated with the nearby deal. For example, a cost (e.g., "$55") is illustrated along with a description of the deal (e.g., "four-course dinner") and an entity associated with the deal (e.g., "Omni"). Optionally, user interface 130 may be presented on the user device 120 based on selection of the link 126 included in the text illustrated in FIG. 1A. For example, selection of the link 126 may cause activation of the application described above, and the application may present information associated with the deal. As another example, selection of the link 126 may cause a browser on the user device to obtain a web page, and upon rendering the web page present user interface 130.

As illustrated in FIG. 1B, a user of the user device 120 has interacted with an option in user interface 130 to select the deal (e.g., "Buy Now"). Upon selection, the location analysis system 100 may update profile information associated with the user to reflect the selection. Additionally, authorization information (e.g., a QR code) may be provided to the user device such that the user can utilize the selected deal.

User interface 134 includes a representation 136 of a QR code (e.g., QR code 124). An entity, such as a system or device associated with an entity, may obtain an image of the representation 136 and confirm that the user is authorized to utilize the selected deal. For example, an employee at a restaurant may utilize a smart phone or other scanning device to scan the QR code. User interface 134 further includes a share option 138 to share the deal. Upon selection of the share option 138, the user interface 134 may update to include functionality to identify a particular user to receive the shared deal. The user may then confirm that the particular user is to receive the representation 136 of the QR code, and the system 100 may provide a notification to the particular user (e.g., for activation by an application on a user device of the particular user). Optionally, upon selection of the share option 138, a text message may be generated that includes, or references, the representation 136 of the QR code. The text message may then be texted to the particular user. Since the representation 136 of the QR code itself may be utilized to confirm with an offering entity (e.g., a restaurant) that the deal can be utilized, the particular user does not need to have downloaded the application or otherwise be associated with the system 100.

FIG. 2 illustrates an example block diagram of a location analysis system 100 in communication with an example entity device 110A and an example user device 120. As described above, the location analysis system 100 may communicate with an application executing on, or otherwise presented on (e.g., via a web page or thin client) entity device A 110A and an application executing on user device 120. For example, user device 120 includes application engine 202, and entity device A 110A includes application engine 216. These applications may share certain information with the location analysis system 100, such as location information 122 for user device 120, to perform one or more of the techniques described herein.

As described above, an entity may create deals for selection by users of user devices. For example, an entity may utilize their device (e.g., entity device A 110) to access user interfaces associated with the system 100 that enable creation of deals. As another example, the entity may specify information associated with deals in another format and provide the specified information to the location analysis system 100. In this example, the information may be specified as text, Extensible Markup Language, JavaScript Object Notation, and so on. The created deals may be provided as deal information 212 to the location analysis system 100 for storage.

User interface 250 is an example of a user interface that may be presented via entity device A 110, and then utilized to create deals. As illustrated, user interface 250 includes an indication of deals 252 already created by an associated entity. For example, the deals 252 may be currently active, deals no longer active but for which users have selected them and can utilize them, or all deals including deals no longer available for utilization. User interface 250 further includes a creation option 254 to create a new deal. As described above, the creation option 254 can present options describing a new deal. Example options may include a textual and/or graphical description of the deal, a cost associated with the deal, one or more locations or branches associated with an entity, an expiration time associated with the deal, and so on. Optionally, the entity associated with entity device A 110A may specify one or more threshold boundaries (e.g., in the form of radii) surrounding the locations or branches in which user devices may be notified of the deal. Optionally, the entity associated with entity device A 110A may specify preference information related to users. For example, the entity may indicate that notifications related to the deal being created should be triggered to users who are interested in certain types of food, certain price points, have purchased certain other deals or types of deals in the past, are of a certain age, and so on. In this way, a new deal may be created and provided as deal information 212 to the location analysis system 100 for storage.

Figure 7A:
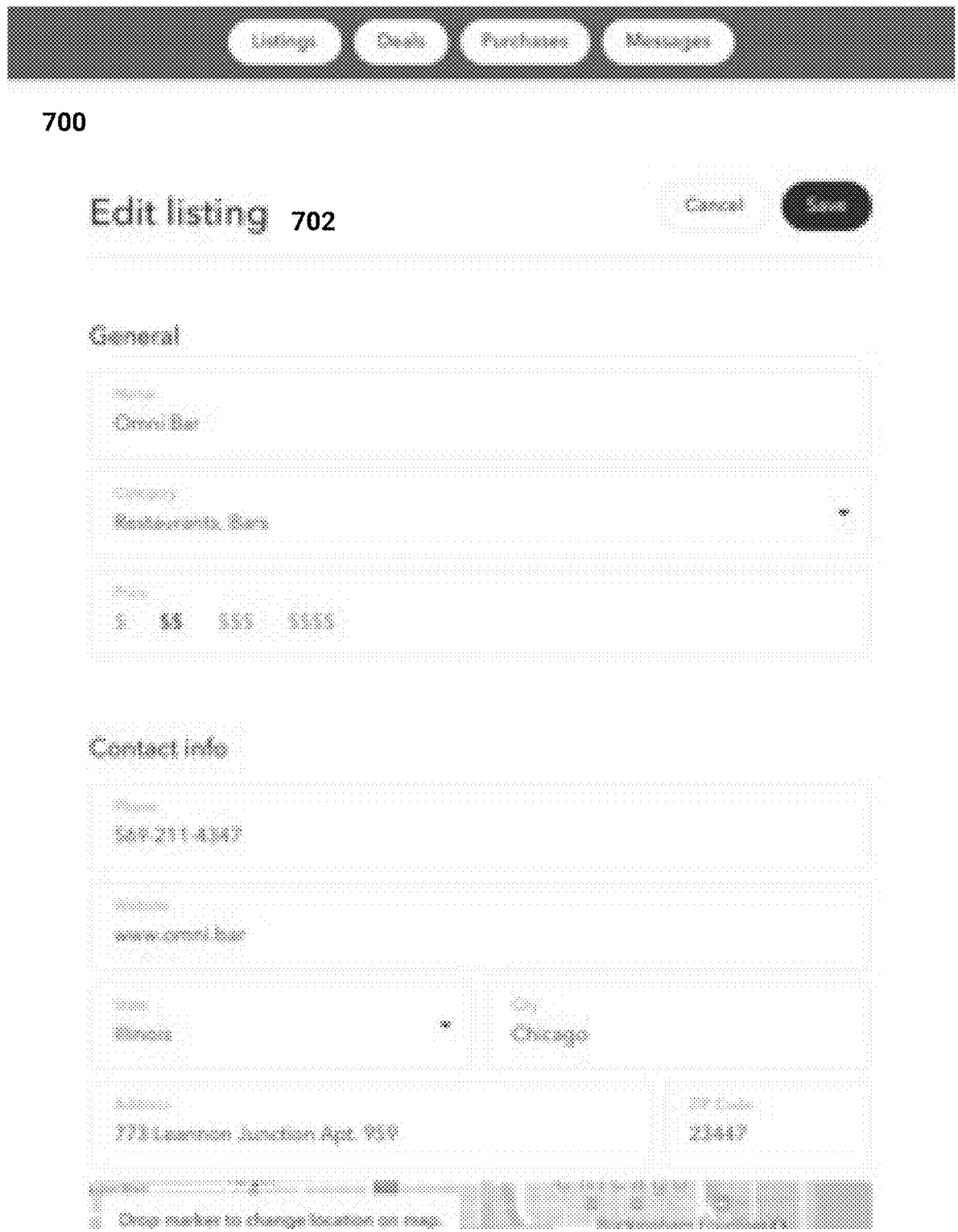
FIGS. 7A-7C illustrate example user interfaces associated with the techniques described herein.

Additionally, the entity device A 110A may cause creation of a profile accessible by users. An example user interface for creating a profile is illustrated in FIG. 7A. The profile may indicate contact information of an associated entity, the type or category of the entity (e.g., restaurant, bar, and so on), address information, etc. Preferably, the contact information may be viewable by a user using a user device. When viewing the profile, the location analysis system 100 may indicate all deals associated with the entity. As illustrated in FIG. 2, profile information 212 may thus be generated and stored by the location analysis system 100.

Figure 7B:
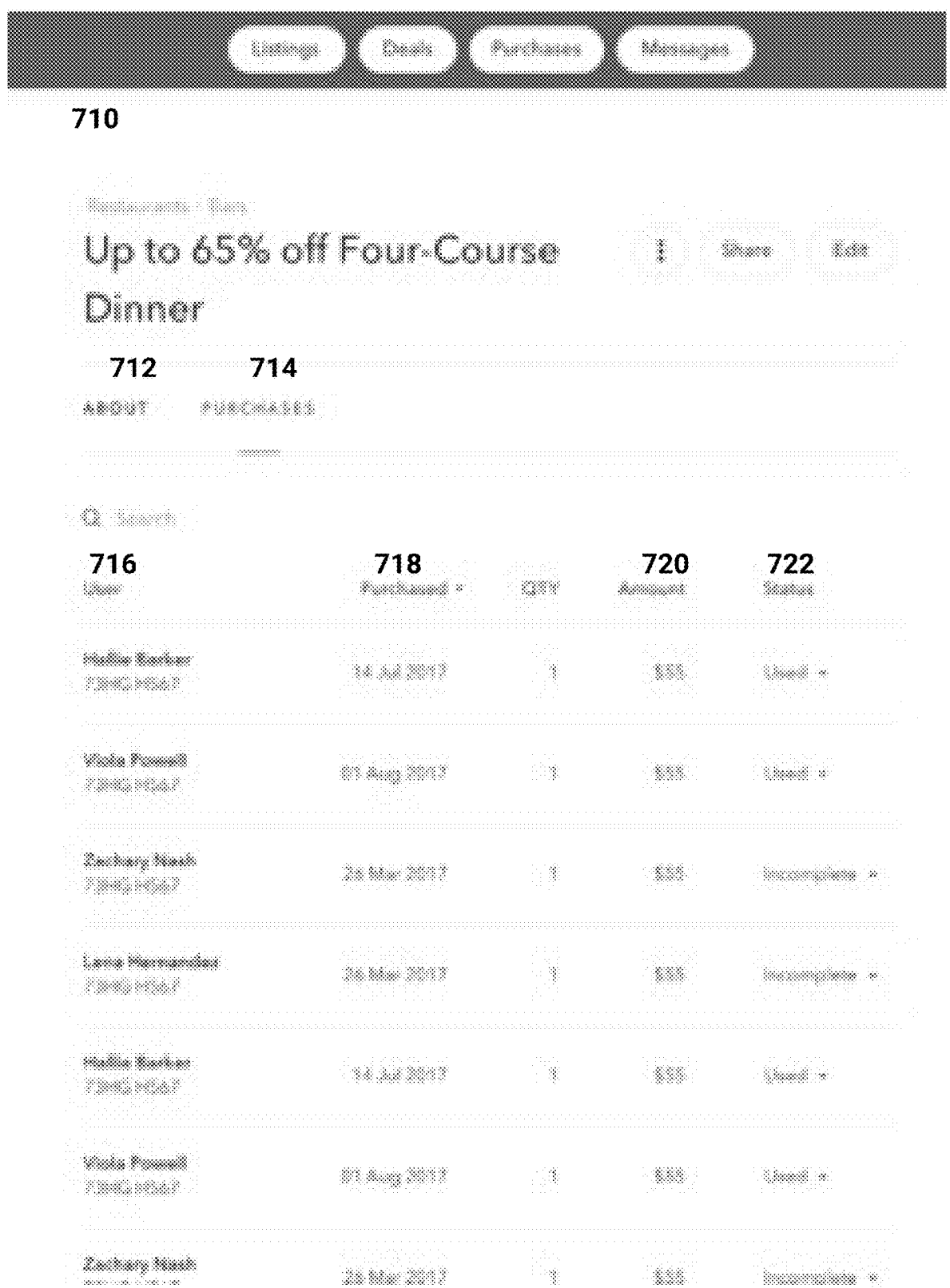

The entity device A 110A may further receive status information 214 from the location analysis system 100 describe statuses associated with their created deals. For example, FIG. 7B illustrates status information associated with a particular deal created by an entity. As will be described below, FIG. 7B indicates summary information associated with the particular deal. Example summary information may include an indication of users who have selected the particular deal, whether the particular deal has been utilized by each user, a quantity of the particular deal selected by each user, and so on. Similar to FIG. 7B, the status information 214 may thus include summary information for all created deals. The entity device A 110A may present the summary information in interactive user interfaces, such that a user associated with the entity may view how deals are faring with users.

As described in FIG. 1A, the user device 120 may receive notifications 106 regarding deals available to a user of the user device. For example, notifications may be triggered based on location information 122 generated by the user device 120. Additionally, the user of the user device 120 may utilize application engine 202 to provide requests 204 to the location analysis system 100. An example request 204 may include a request for deals located within a threshold distance of the user's current location. The user may further specify a type of deal, a specific entity, and so on. The location analysis system 100 may analyze stored deal information 212, and cause presentation of information servicing the request 204. For example, the user device 120 may present a map (e.g., as illustrated in FIG. 5C) illustrating locations of entities and information describing one or more of their respective deals. The user of the user device 120 may then provide user input to select a deal for utilization.

Upon selection of a deal, the location analysis system 100 may update profile information of the user to reflect the selected deal. Additionally, or alternatively, the location analysis system 100 may provide authorization information 206 to the user device 120. As described above, authorization information 206 may include a QR code. Authorization information 206 may further include a token associated with the system 100 (e.g., an OAuth token). To utilize a selected deal, the user device 120 may present a representation of the QR code.

Additionally, the user device 120 may cause a transfer of information from the user device 120 to a device associated with an entity. For example, deals available for utilization by the user may be stored by the application engine 202 (e.g., in a deal wallet). The user may be required to confirm his/her identity via a password, biometric authentication, and so on, to access the available deals. Upon confirmation, the user device 120 may transmit information (e.g., an OAuth token, JSON token, encrypted information) to the device associated with the entity. Optionally, the user device 120 may transmit information to the system 100 indicating utilization of the deal. The system 100 may then update the user's profile information to reflect the utilization, and update profile information of the entity to specify that the user is authorized to utilize the deal. Optionally, the system 100 may push information to devices of the entity reflecting the user's authorization to utilize the deal. As described above, payment from the user to the entity may be handled, at least in part, by the location analysis system 100. In this way, the user may simply select a deal associated with an entity, and receive the benefit of the deal through minimal user input.

Figure 3A:
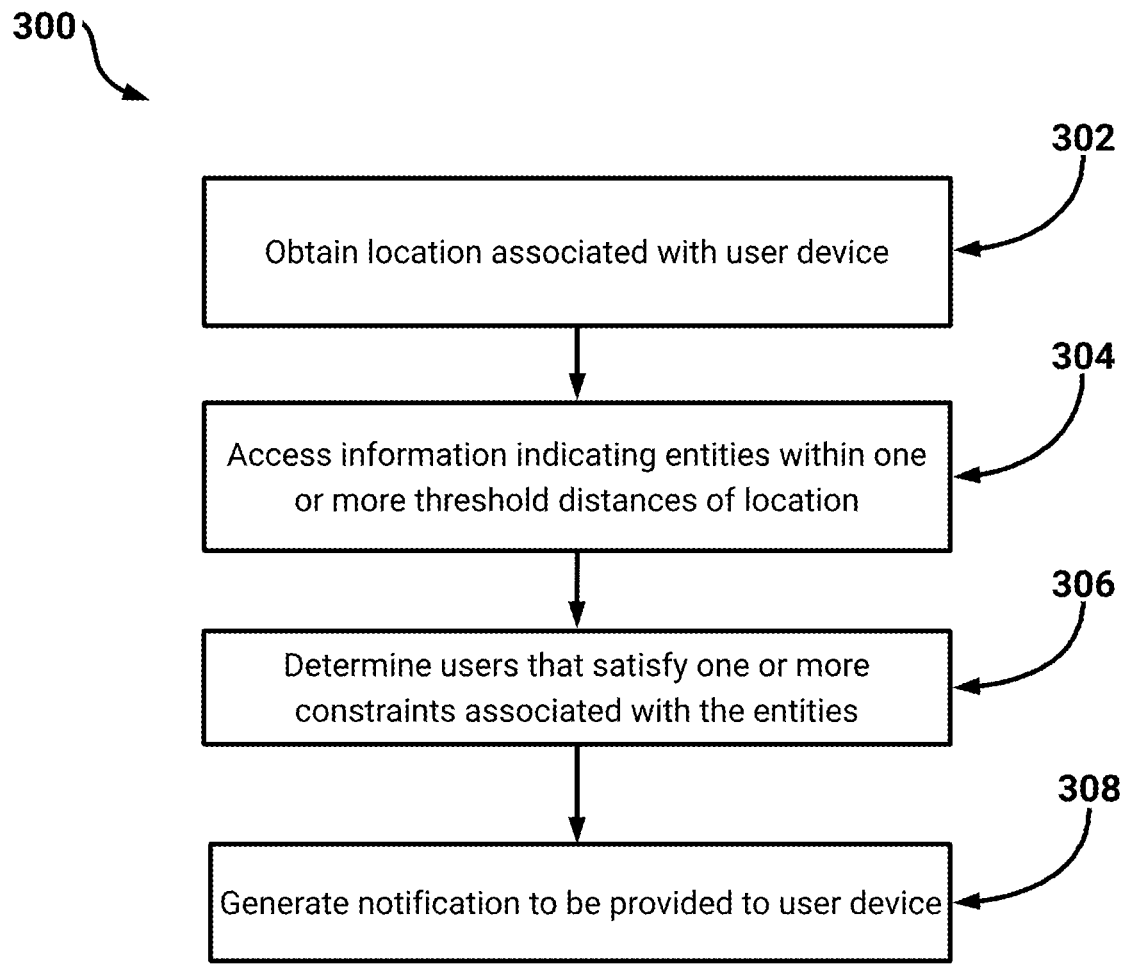
FIG. 3A illustrates a flowchart of an example process for generating notifications to be provided to user devices.

FIG. 3A illustrates a flowchart of an example process 300 for generating notifications to be provided to user devices. For convenience, the process 300 will be described as being performed by a system of one or more computers (e.g., the location analysis system 100).

At block 302, the system obtains a location associated with a user device. For example, the system may periodically receive GPS coordinates of user devices from applications executing on the user devices.

At block 304, the system accesses information indicating entities located within one or more threshold distances of the obtained location. To ensure that notifications describing deals are related to the user's actual location, and thus increase a likelihood that the user will take advantage of a deal, the system compares the user's location to locations of entities. As an example, the system may generate a geofence surrounding the user's location. For example, the geofence may extend a particular distance around the user (e.g., two blocks, four blocks, a quarter of a mile, a user definable distance) or otherwise define a boundary around the user. Any entities that are located within this geofence may then be identified by the system. Optionally, the system may access geofence information for each entity within the geofence and may remove entities whose own geofences do not overlap with the user's geofence.

As an example, a particular entity may indicate that it is only interested in users who are two blocks away. If the user is four blocks away, then the system may discard the particular entity from the accessed information. The particular entity may elect this two block distance to reduce costs associated with notifying users. The particular entity may also elect this two block distance to ensure that only users who are likely to select a deal associated with the particular entity are notified. For example, users may be uninterested in walking further than two blocks for a deal on coffee.

At block 306, the system may optionally determine users who satisfy one or more constraints associated with the entities indicated in block 304. As an example, an entity may indicate that only users who conform to certain preference information are to receive notifications of their deals. As described above, example preference information may be based on historical information of users (e.g., deals previously selected by the users), search queries provided by users (e.g., to identify user interests), and so on. Thus, the user of the user device may optionally be ensured to satisfy the constraints.

At block 308, the system generates a notification to be provided to the user device. As described in FIGS. 1A-1B, the notification may be provided as a text to the user device. For example, the system may access profile information associated with the user, and text a notification to a phone number of the user. Optionally, the notification may be provided as a message pushed to an application executing on the user device. As described above, the notification may indicate information describing a particular deal. Optionally, the system may limit a quantity of notifications that a user device will receive in a period of time. As described above, the system may select a deal that is most likely to be selected by the user. Additionally, the system may implement an intelligent bidding system such that entities may automatically place bids to have their deal selected.

Figure 3B:
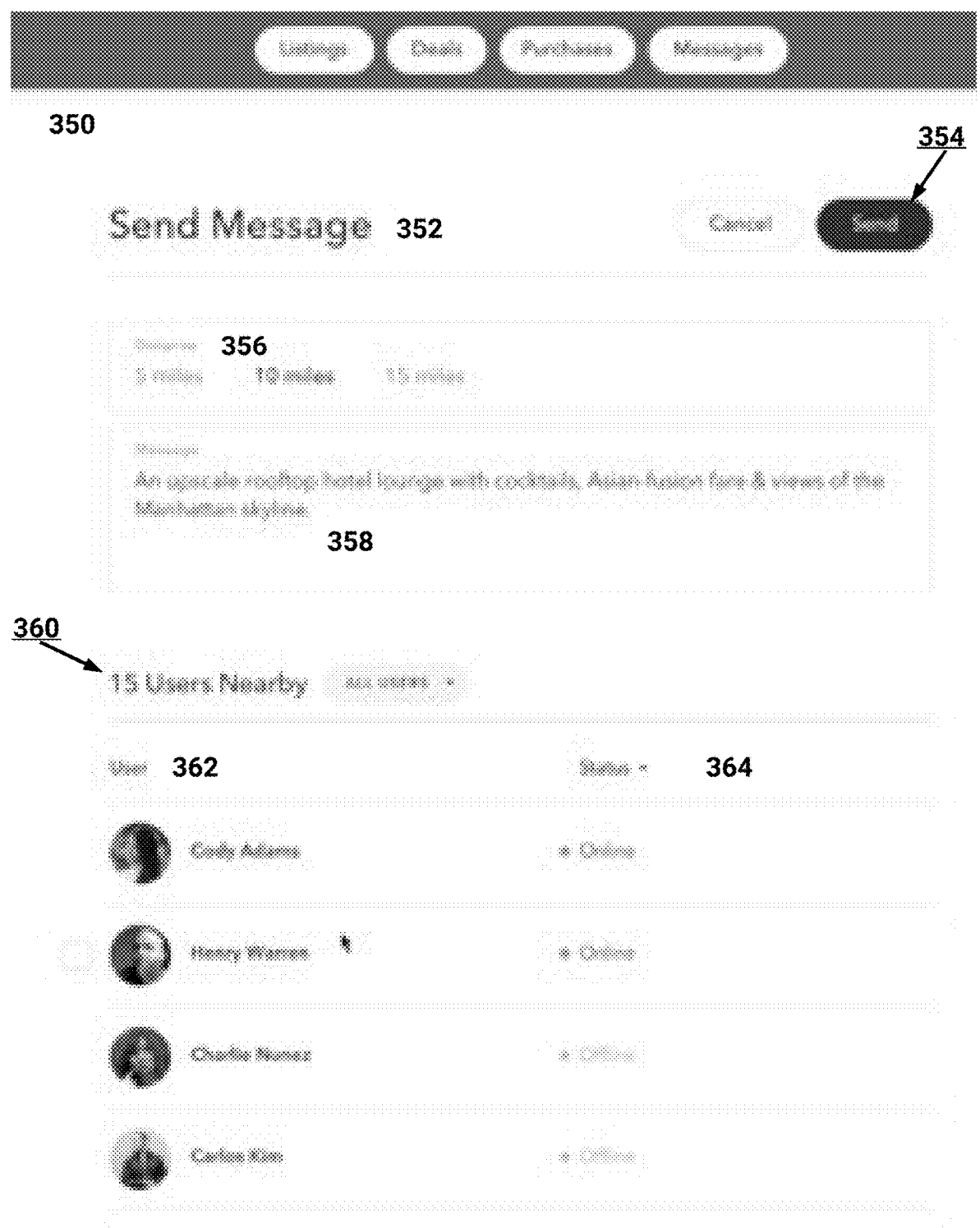
FIG. 3B illustrates an example user interface for an entity to transmit a notification to one or more users.

FIG. 3B illustrates an example user interface 350 for an entity to transmit a notification to one or more users. In addition to the system automatically providing a notification to a user (e.g., as described in FIG. 3A), an entity may monitor indications of users located proximate to the entity and trigger notifications to select users. For example, user interface 350 may be an example of a user interface presented on a device associated with an entity. User interface 350 may be generated by an application executing on the device or may be presented in a web page generated, at least in part, by the location analysis system 100.

In portion 352 related to sending a message, user interface 350 includes a textual portion 358 in which a description of an entity and/or an available deal may be included. For example, textual portion 358 indicates that the entity is "an upscale rooftop hotel lounge with cocktails." The portion 352 enables a user of the user interface 350 to indicate a distance 356 around the entity for which users located within the distance 356 may be notified. As illustrated, an example distance 356 may include 5 miles, 10 miles, 15 miles, and so on. A user of user interface 350 may utilize selectable option 354 to send a message to a specific user, for example one or more of the users indicated in portion 360.

In portion 360, user interface 350 presents an indication of users who are nearby to the entity. For example, nearby may represent users who are within the distance 356 selected in the user interface 350. As illustrated, an identification 362 of the users may be included, such as a name of the user, a username of the user, and so on. Optionally, a name of the user may be hidden and certain summary information associated with the user may instead be presented in user interface 350. For example, preference information of the user may be shown such as whether the user has selected the entity's deals in the past, whether the user's preferences are similar to deals being offered by the entity, and so on. Portion 360 further includes a status 364 of each user. For example, the status may indicate whether the user has opened an application associated with the location analysis system 100 within a threshold amount of time.

Thus, user interface 350 can enable a user to localize users within a selected distance of a location of an entity. The user may then trigger notifications (e.g., messages) to be provided to these localized users.

Figure 4:
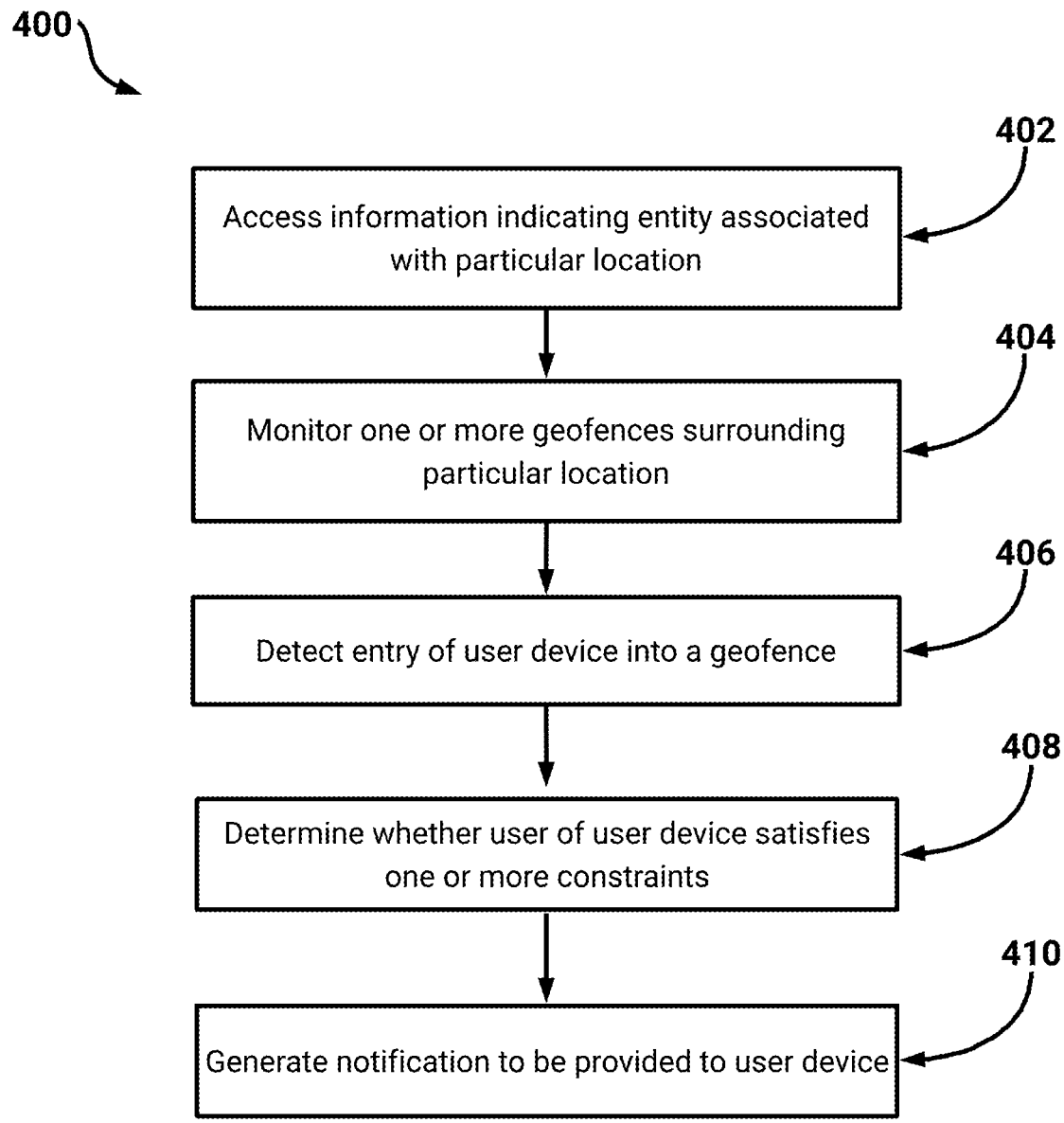
FIG. 4 illustrates a flowchart of another example process for generating notifications to be provided to user devices.

FIG. 4 illustrates a flowchart of another example process 400 for generating notifications to be provided to user devices. For example, the notifications may be geomessaging notifications. For convenience, the process 400 will be described as being performed by a system of one or more computers (e.g., the location analysis system 100).

At block 402, the system accesses information indicating a location of an entity. For example, the location may represent GPS coordinates, address information, and so on.

At block 404, the system monitors one or more geofences surrounding the particular location. As described above, the system may store information indicating distances or geofences surrounding each entity. These indicated distances or geofences may encompass a geographic area in which the entity is interested in notifying users of available deals. Optionally, the entity may specify multiple distances or geofences. For example, the entity may indicate that users who satisfy particular constraints (e.g., certain interests, certain previous deal selections, and so on) are to be notified if they are within a first threshold distance from the entity.

For users who do not satisfy the particular constraints, the entity can indicate that these users are to be notified if they are located within a second, smaller, threshold distance from the entity. The system may monitor these geofences or distances for entry of user devices. Optionally, the system may monitor for exits of user devices, and may optionally notify a user who is about to leave a geofence to consider a deal.

At block 406, the system detects entry of a user device into a geofence. For example, a user of the user device may be traversing a geographic area and may enter in a geofence associated with the entity.

At block 408, the system optionally determines whether the user of the user device satisfies constraints. As described in FIG. 3A, the system may ensure that the user's preferences comport with preferences identified by the entity.

At block 410, the system generates a notification to be provided to the user device. For example, the notification may be a text provided to a number associated with the user device. As another example, the notification may a message pushed to an application executing on the user device. The notification may indicate one or more deals associated with the entity. The notification may also describe the entity, for example as illustrated in user interface 350 in textual portion 358. The user of the user device may then optionally interact with the notification to view deals offered by the entity. For example, if the notification is provided via the application the user may select (e.g., via a touch-sensitive display) a name of the entity. The application may then present deals available to the user. As another example, if the notification is a text the user may select a link included in the text. The link may then cause activation of the application or may present deals in a web page of a browser executing on the user device.

Figure 5A:
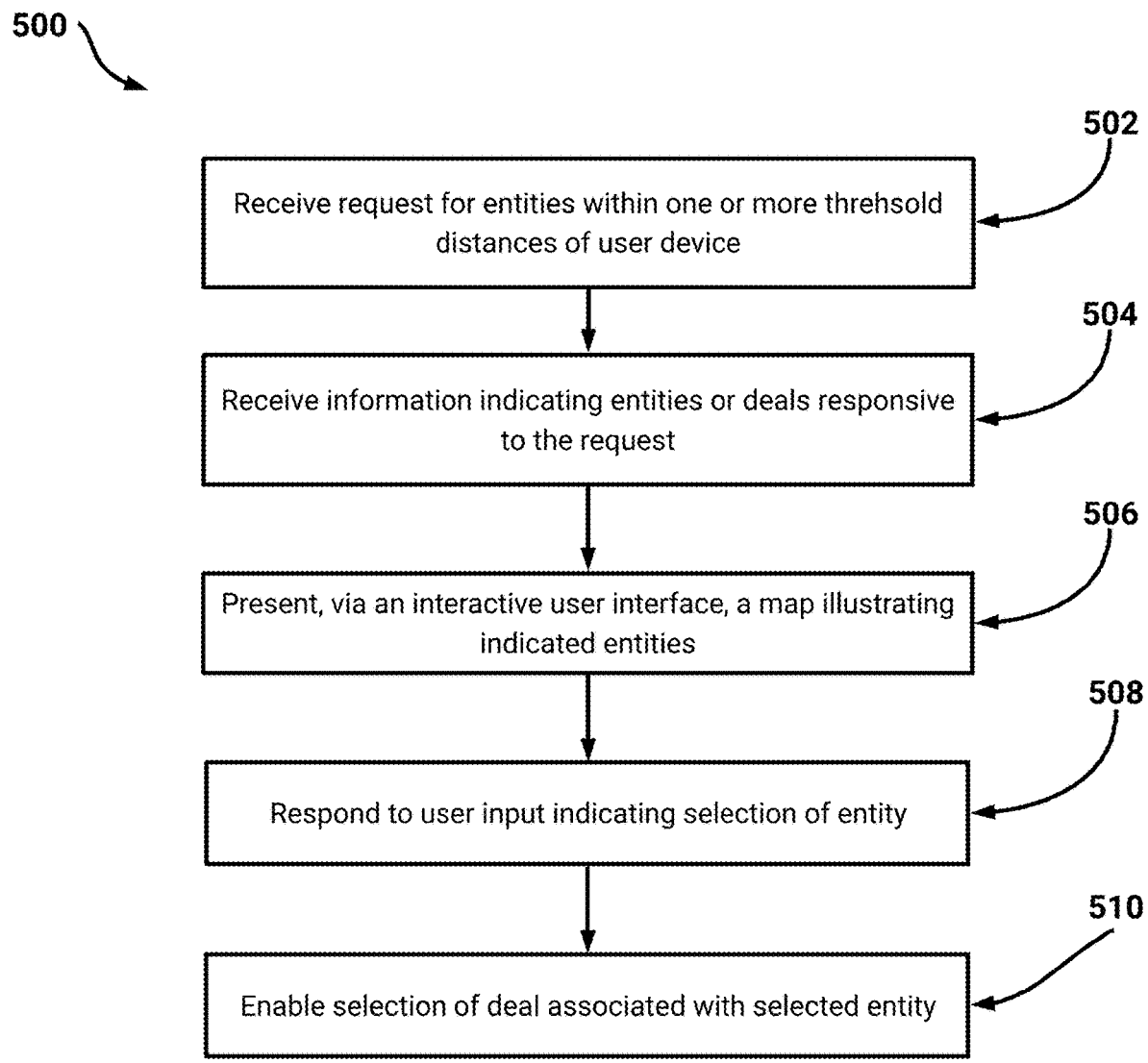
FIG. 5A illustrates a flowchart of an example process for enabling user selection of a deal.

FIG. 5A illustrates a flowchart of an example process 500 for enabling user selection of a deal. For convenience, the process 500 will be described as being performed by a user device of one or more processors (e.g., the user device 120).

At block 502, the user device receives a request for entities within one or more threshold distances of the user devices. The user device may execute an application, for example as described above, and present user interfaces to a user of the user device.

Figure 5B:
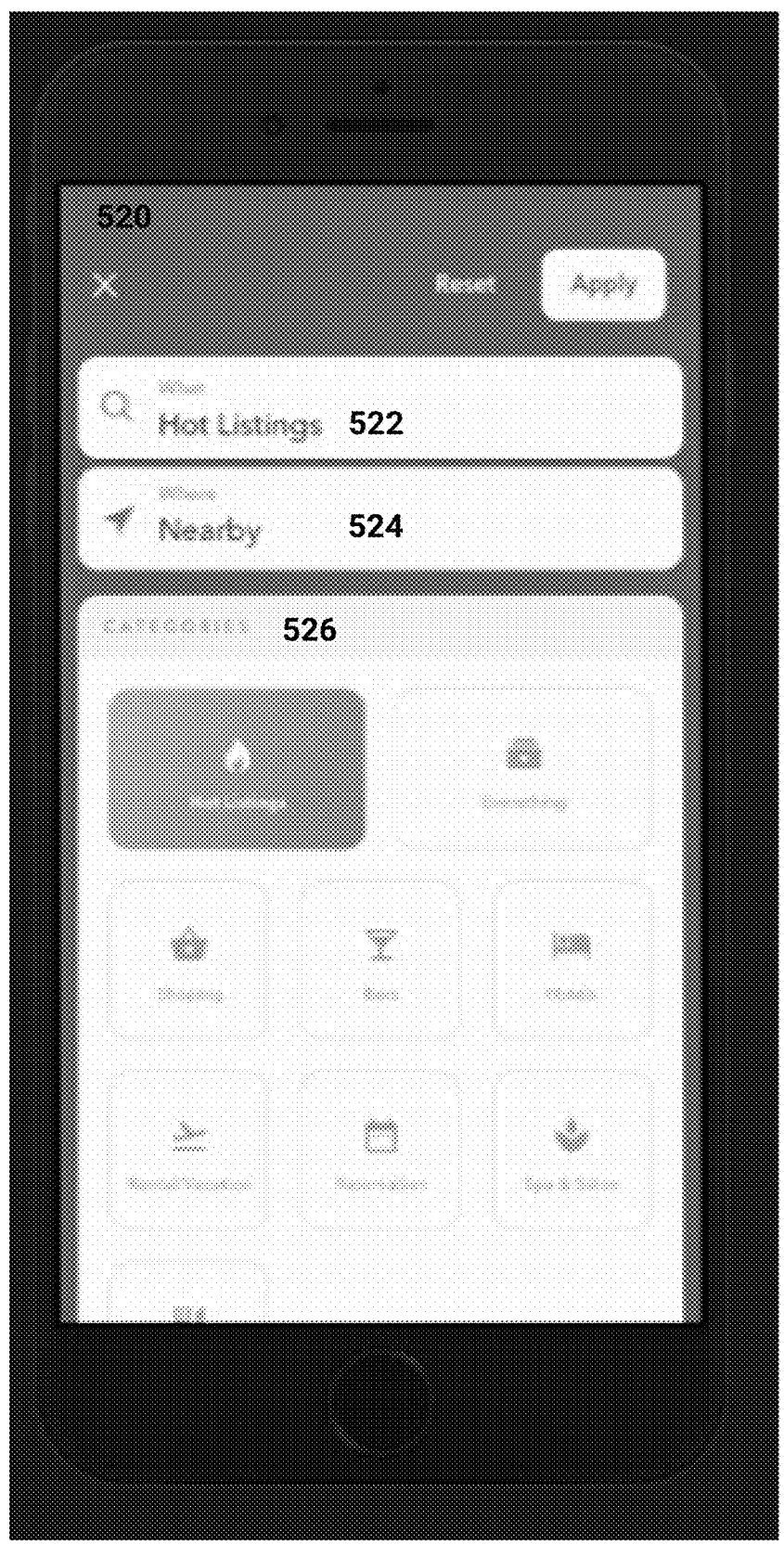
FIG. 5B illustrates an example user interface for viewing deals.
Figure 5C:
FIG. 5C illustrates example user interfaces for enabling user selection of a deal.
Figure 5C:
Figure 5C:
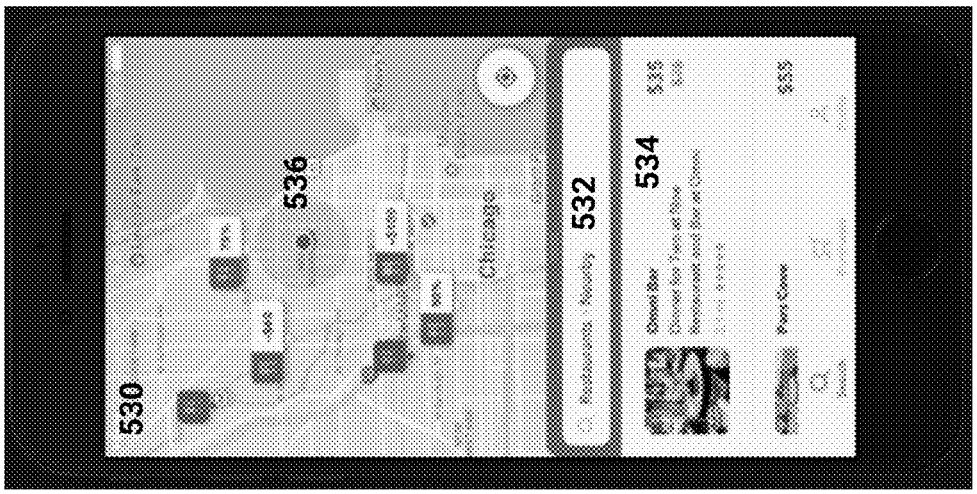

For example, FIG. 5B illustrates an example user interface 520. User interface 520 includes options enabling the user to search for specific types of deals 522 and to limit the deals to particular locations 524. For example, as illustrated, the user has selected "Hot Listings," indicating deals that have been selected greater than a threshold number of times or that have been selected with greater than a threshold frequency. "Hot Listings" may also indicate deals that have been reduced in cost greater than a threshold. The particular location 524 is indicated as "Nearby." As described above, the user may indicate one or more distances for which they are interested in receiving deals. Thus, the particular location 524 may be updated to reflect a specific distance. User interface 520 further includes categories 526 available for selection. Example categories may include shopping, bars, hotels, and so on as illustrated in FIG. 5B. Based on the selections of various options in FIG. 5B, the application may generate a request for information. The request may then be transmitted to the location analysis system 100.

At block 504, the user device receives information indicating entities or deals that are responsive to the request. For example, if the request was a request for "Hot Listings" located "Nearby," the user device may receive indications of specific deals. Other requests may include requests for entities that are proximate to the user device. For these requests, the user device may receive information indicating the entities.

At block 506, the user device presents the received information. For example, the user device may present a map illustrating at least a portion of the received information. FIG. 5C illustrates example user interfaces according to the techniques described herein. In user interface 530, a map of a particular geographic area surrounding the user 536 is presented. In the map, representations of deals are presented. For example, a representation may include a cost associated with the deal, a reduction from a normal cost (e.g., the deal saves $60 or the deal saves $75%), and an indication of a type of the deal (e.g., restaurant, bar, hotel). In portion 532 the user of the user device may update the request. For example, the user may indicate that he/she is interested only in restaurants. In portion 534, more detailed information related to the deals presented on the map is included. Similarly, user interface 540 illustrates the received information without including a map. In this way, the user may view detailed information related to more of the deals proximate to the user. Since the user device may have limited display real estate, the user may toggle between user interface 530 and user interface 540 to remove the map from the display.

At block 508, the user device responds to user input indicating selection of an entity. In FIG. 5C, user interface 550 includes deals associated with a particular entity (e.g., "Omni Bar"), which may be selected by the user. As described above, each entity may offer multiple deals available for selection. Thus, if the user selects a particular entity, user interface 550 may be presented illustrated all deals available from the particular entity. Optionally, the deals may be ordered according to cost or according to expiration date. Additionally, the deals may be ordered based on determined likelihood that the user may select the deal. For example, the system may determine that a particular deal is similar to deals historically selected by the user. As another example, the system may determine that a particular deal is for a number of people that conforms to a family size associated with the user. In this example, the system may determine that a time of day corresponds to dinner, and determine that the user may be trying to locate dinner deals for his/her family.

At block 510, the user device enables selection of a particular deal. The user device may respond to user input selecting a deal, such as deal 554. As described above, the user device may then receive authorization information for the deal 554 (e.g., a QR code to be presented at the "Omni Bar").

Figure 6:
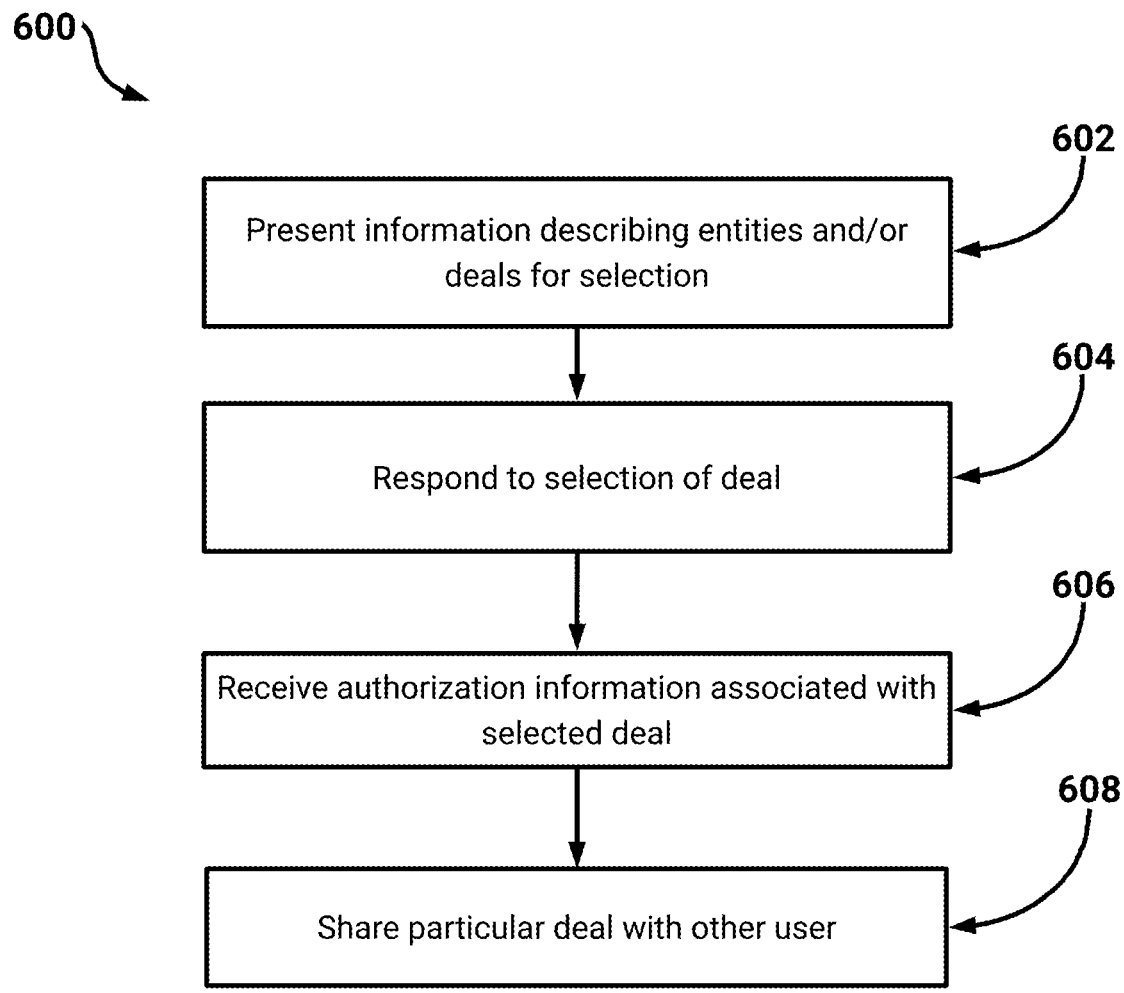
FIG. 6 illustrates a flowchart of an example process for sharing a deal with a user.

FIG. 6 illustrates a flowchart of an example process 600 for sharing a deal with a user. For convenience, the process 600 will be described as being performed by a user device of one or more processors (e.g., the user device 120).

At block 602, the user device presents information describing entities and/or deals available for selection. As described above, the user device may execute an application which presents a user interface via a display of the user device. For example, the user device may present a map illustrating deals and/or entities that are located proximate to the user device (e.g., as illustrated in FIG. 5C). As another example, the user device may receive one or more texts regarding deals located proximate to the user device. As described above, the texts notifications may include selectable elements associated with presentation of information regarding the deals. For example, a text may cause activation of the application. In this example, the application may present information describing a deal. Similarly notifications may be received, such as via the application, and the notifications may include selectable elements associated with presentation of information regarding the deals. Example information may include a name of an entity associated with a deal, a cost, a description, a map associated with the entity's location, and so on as described herein.

At block 604, the user device responds to selection of a deal. As described above, a user of the user device may select a particular deal for utilization. For example, the application may enable selection of the particular deal. As another example, the user may respond to a text message to confirm selection of the particular deal. Advantageously, the user may use a portion, or all of, the user's bonus points. The bonus points may be assigned based on a number of text messages regarding proximate deals which have been received by the user. Bonus points are described in more detail below, with respect to FIG. 9.

At block 606, the user device receives authorization information. For example, the authorization information may be received as a graphical representation. In some embodiments, the graphical representation may be a QR code. Thus, and as described above, the authorization information may include a QR code.

At block 608, the user device shares the deal with another user. With respect to a QR code, the user may text or otherwise provide (e.g., via a message, email, and so on) the QR code to the other user. Optionally, instead of receiving authorization information in block 606, the authorization information be provided directly to the other user. For example, the location analysis system 100 may provide a text or message of the QR code to the other user (e.g., the other user's phone number or email address may have been obtained or specified by the user). If the other user has a user name with the location analysis system 100, the user may specify the other user (e.g., via a contacts list), and the system 100 may provide a QR code directly to the other user's application, which is installed on the other user's device and connected to the system 100.

Figure 7C:
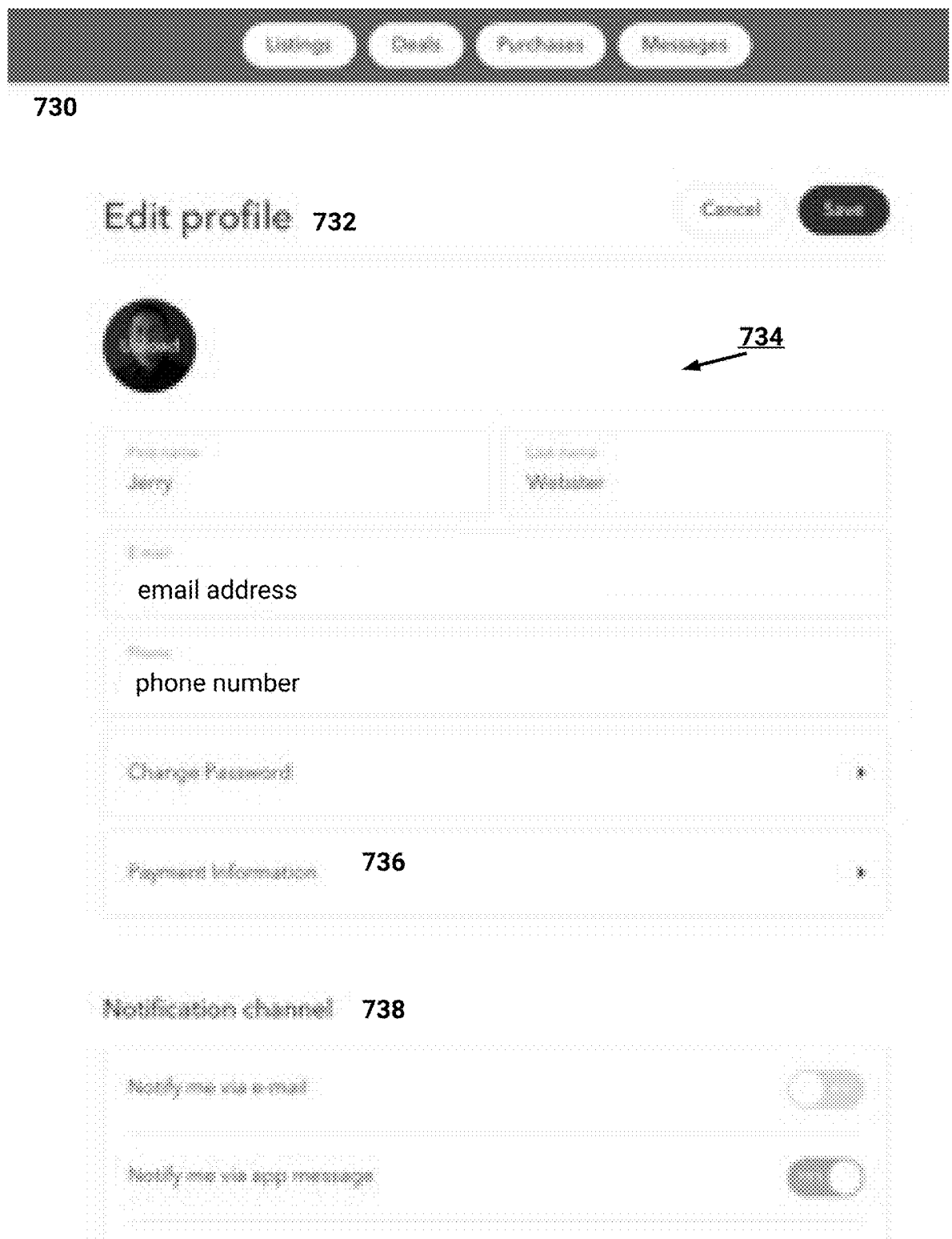

FIGS. 7A-7C illustrate example user interfaces associated with the techniques described herein. In this example, the user is the entity providing deals or the person representing the entity providing deals, and the user interface 700 may be utilized by that user to update the entity's profile information. For example, as illustrated, the profile information may be provided to the user. As illustrated, the profile information includes a name of the entity, a category of the entity (e.g., restaurant, hotel, and so on), a pricing tier associated with the entity, and contact information of the entity.

User interface 710 (e.g., illustrated in FIG. 7B) illustrates status information of a particular deal. For example, the user interface 710 is presenting status information for a deal offering "65% off four-course dinner." A user of the user interface 710, such as an entity offering the deal, may view a description 712 of the deal and selections 714 (e.g., "purchases) of the deal. With respect to the description 712, user interface 710 may present a textual description specified by the entity or automatically generated by the location analysis system 100. The user of user interface 710 may then update or otherwise modify the description. With respect to selections 714 of the deal, an indication of users 716 who have selected the deal are included. Additionally, a date of selection 718, a quantity of the selection 720, and/or a status of the selection 722 (e.g., used, not used, expired) may be presented.

User interface 730 (e.g., illustrated in FIG. 7C) illustrates profile information for a user. Portion 732 includes options enabling the user to update identifying and/or contact information 734 (e.g., name, email address, phone number, and so on). Additionally, the user may update payment information 736, such as including payment instruments and/or indicating certain apps on the user's user device that may supply payment information. Additionally, the user can specify methods of notifications 738. For example, the user can indicate that he/she prefers to be notified via email, via an in-app message, and/or via text.

Figure 8A:
FIGS. 8A-8B illustrate example user interfaces associated with bonuses according to the techniques described herein.
Figure 8B:
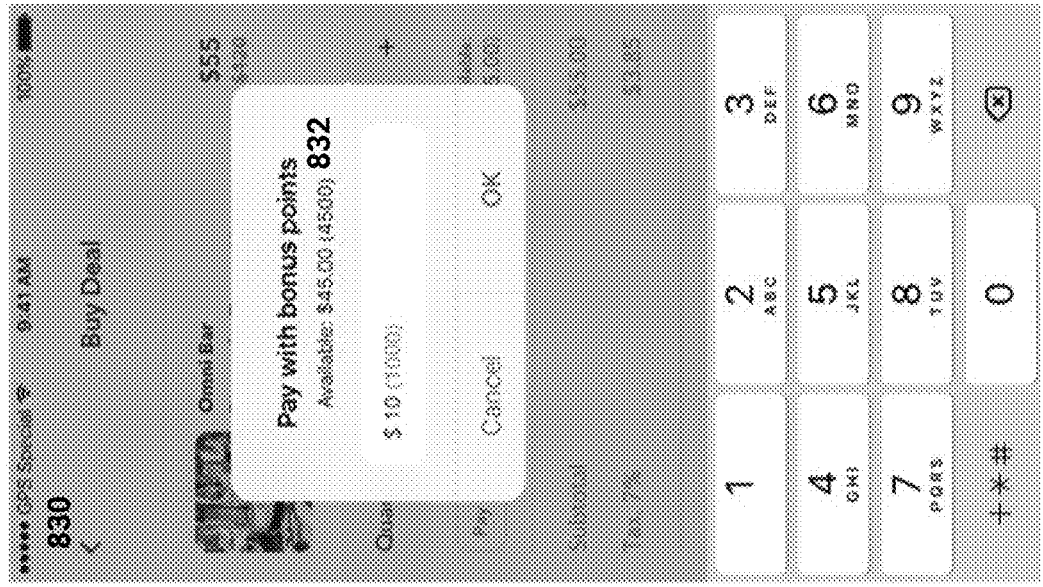
Figure 8B:
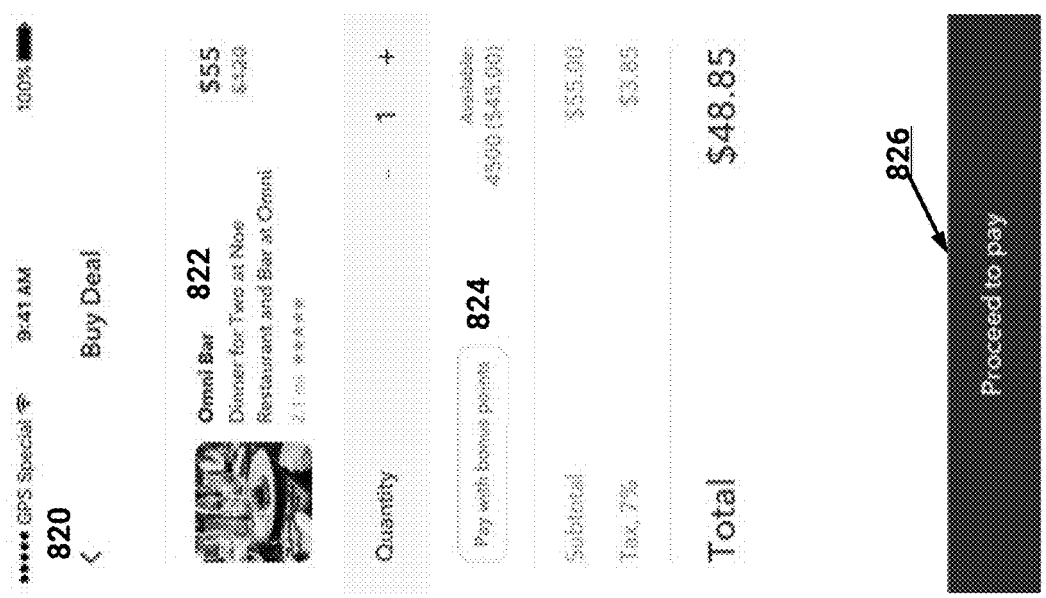

FIGS. 8A-8B illustrate example user interfaces associated with bonuses according to the techniques described herein. In this example, the users are users that receive deals from the system 100. As the users select deals and utilize the deals, the users may optionally be awarded bonus points. For example, the location analysis system 100 may offer bonus points as an incentive. As illustrated in FIG. 8A, user interface 800 may therefore present bonus points earned by a particular user along with an example conversion ratio to currency. User interface 810 illustrates a particular user 812 along with entities bookmarked 814 by the particular user 812 for later review. For example, portion 816 includes representations of entities. The particular user 812 may select an entity, and select a deal associated with the entity.

User interface 820 (e.g., illustrated in FIG. 8B) is an example user interface for selecting a particular deal. For example, the particular user 812 is viewing a deal 822 associated with dinner. As illustrated, a representation of the bonus points 824 available to the particular user is included in user interface 820. The bonus points 824 may be utilized to pay for all of, or a portion of, the cost associated with the deal 822. User interface 830 illustrates the user proceeding with selection of the deal 822. For example, user interface 830 may be presented upon interaction user interface element 826. As illustrated in user interface 830, the particular user 832 may specify an amount 832 of bonus points, or an amount of currency converted from bonus points, to be utilized for selection of the deal 822. In the example of user interface 830, the particular user has selected $10.

Figure 9:
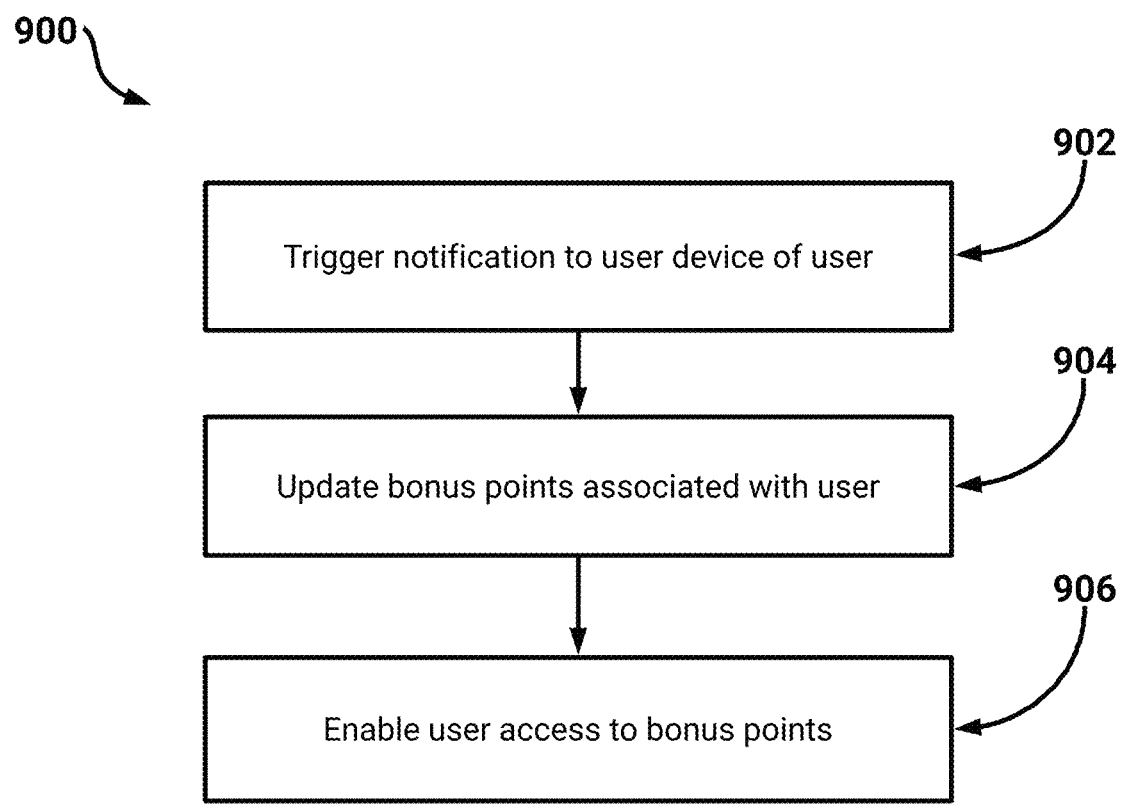
FIG. 9 illustrates an example flowchart of a process for enabling access to bonuses via a user device.

FIG. 9 illustrates an example flowchart of a process 900 for enabling access to bonuses via a user device. For convenience, the process 900 will be described as being performed by a system of one or more computers (e.g., the location analysis system 100).

At block 902, the system triggers notifications to a user device. As described above, for example at least in FIGS. 3A-3B, the system can utilize location information obtained from user devices (e.g., GPS coordinates) to trigger notifications to user devices. For example, the system may determine that a user device is located within a threshold distance of a particular entity. The system may then cause a notification associated with the particular entity to be provided to the user device. As described above, a notification may be provided as a text message to the user device. As another example, described above at least in FIG. 4, the system may monitor one or more geofences surrounding the particular entity. In this example, the system may detect that the user device has entered the geofence and cause a notification to be provided to the user device. Notifications may also include application-based notifications.

At block 904, the system updates bonuses associated with the user. As described in FIGS. 8A-8B above, bonus points may be associated with the user and usable when selecting a particular deal. The system may assign to the user, or otherwise enable access of, a particular quantity of bonus points for a received notification. That is, in exchange for the user's time, cellular bandwidth, text messaging limitations, and so on, the system may provide bonus points for each notification. Optionally, a type of entity associated with a notification may inform a quantity of bonus points assigned to the user.

For example, the system may provide greater bonus points for notifications identifying types of entities in which the user has indicated an interest. As an example, if the user historically has selected deals associated with restaurants, the system may assign greater bonus points for notifications identifying restaurant deals. As another example, if the user does not normally select deals associated with restaurants, the system may assign greater bonus points for notifications identifying restaurant deals or other deals which may otherwise be of less interest to the user (e.g., to encourage the user to select restaurant deals and/or to decrease user objections/resistance to receiving notifications of deals for which they may otherwise have less interest in receiving).

To update the bonus points, the system may update profile information associated with the user, for example as described in FIG. 2 above. As an example, the system may increase (e.g., credit) a particular quantity of bonus points stored in the user's profile information. Optionally, a user application on the user device may receive updated information indicating the increased bonus points. For example, the user application may enable a secure wallet accessible by the user which stores secure information and to which the bonus points may be credited. To access the wallet, the user application may require a biometric authentication of the user.

At block 906, the system enables access to the bonus points. As described in FIGS. 8A-8B, the user may utilize the bonus points when selecting a deal. Upon selection, the system may reduce (e.g., debit) the bonus points associated with the user.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method implemented by a system of one or more computers, the method comprising:
    monitoring location information associated with a plurality of user devices including a first user device, the location information being periodically provided by the user devices via respective applications executing on the user devices, the applications using information associated with global navigation satellite system (GNSS) receivers of the user devices;
    accessing information indicating entities located within one or more threshold distances of the first user device of the plurality of user devices based on the monitored location information, wherein accessing information comprises:
        determining a geofence surrounding the first user device, the geofence representing a virtual perimeter for a real world area, and
        identifying entities located within the geofence;
    generating a notification to be provided to the first user device via a first text message, the notification indicating information associated with an entity of the indicated entities, wherein the information includes one or more selectable elements associated with presentation, via the application executed by the first user device, of a deal associated with the entity which is available for selection;
    in response to the first text message being provided to the first user device, updating bonus points associated with a first user of the first user device, the bonus points being usable by the first user, via the application, to select deals, and wherein the bonus points are increased based on authorization by the first user to receiving text messages, and wherein an indication of the bonus points is stored via a secure wallet associated with the first user device;
    generating authorization information associated with the deal, the deal being selected by the first user to complete a transaction associated with the deal, wherein at least a portion of the bonus points were applied to select the deal; and
    transmitting, via a second text message or a notification associated with the application, a redeemable representation of the authorization information to the first user device, wherein the redeemable representation is configured to be shared with a second user device via text message, such that the deal is configured to be redeemable by a second user of the second user device.

2. The method of claim 1, wherein location information includes global positioning system coordinates.

3. The method of claim 1, wherein the redeemable representation is transmitted via the second text message.

4. The method of claim 1, wherein the redeemable representation is transmitted as a message to be pushed to the application executing on the first particular user device.

5. The method of claim 1, wherein the method further comprises:
    receiving information indicating user selection of one or more selectable elements associated with presentation of the deal; and
    causing, via the first user device, presentation of information describing the deal.

6. The method of claim 1, wherein the redeemable representation of the authorization information comprises a QR code.

7. A system of one or more computers and non-transitory computer storage media storing instructions that when executed by the system of one or more computers, cause the system to perform operations comprising:
monitoring location information associated with a plurality of user devices including a first user device, the location information being periodically provided receivable by the user devices via respective applications executing on the user devices, the applications using information associated with global navigation satellite system (GNSS) receivers of the user devices;
accessing information indicating entities located within one or more threshold distances of the first user device of the plurality of user devices based on the monitored location information, wherein accessing information comprises:
determining a geofence surrounding the first user device, the geofence representing a virtual perimeter for a real world area, and
identifying entities located within the geofence;
generating a notification to be provided to the first user device as a first text message, the notification indicating information associated with an entity of the indicated entities, wherein the information includes one or more selectable elements associated with presentation, via the application executed by the first user device, of a deal available for selection;
in response to the first text message being provided to the first user device, updating bonus points associated with a first user of the first user device, the bonus points being usable by the first user, via the application, to select deals, and wherein the bonus points are increased based on authorization by the first user to receiving text messages, and wherein an indication of the bonus points is stored via a secure wallet associated with the first user device;
generating authorization information associated with the deal, the deal being selected by the first user to complete a transaction associated with the deal, wherein at least a portion of the bonus points were applied to select the deal; and
transmitting, via a second text message or a notification associated with the application, a redeemable representation of the authorization information to the first user device, wherein the redeemable representation is configured to be shared with a second user device via text message, such that the deal is configured to be redeemable by a second user of the second user device.

8. The system of claim 7, wherein location information includes global positioning system coordinates.

9. The system of claim 7, wherein the redeemable representation is transmitted as the second text message.

10. The system of claim 7, wherein the redeemable representation is transmitted as a message to be pushed to the application executing on the first user device.

11. The system of claim 7, wherein the operations further comprise:
receiving information indicating user selection of one or more selectable elements associated with presentation of the deal; and
causing, via the first user device, presentation of information describing the deal.

12. The system of claim 7, wherein the redeemable representation of the authorization information comprises a QR code.

13. A method implemented by a first user device of one or more processors, the method comprising:
presenting, via an interactive user interface generated by an application executing on the first user device, a map illustrating entities proximate to a location of a first user device, the location being based on information associated with a global navigation satellite system (GNSS) receiver of the first user device, the application being in communication with a system of one or more computers via a network, wherein the system is configured to determine a geofence surrounding the first user device, the geofence representing a virtual perimeter for a real world area, and identify entities located within the geofence,
wherein the interactive user interface is configured to:
present an indication of bonus points available for use, the bonus points being assigned, by the system, upon receipt of text messages by the first user device regarding a deal proximate to a location of the first user device, wherein the bonus points are increased based on authorization by a user of the first user device to receiving the text messages, and wherein an indication of the bonus points is stored via a secure wallet associated with the first user device;
receiving selection, by the application, of a particular entity, and presenting deals associated with the particular entity, the deals being received for presentation by the system;
in response to user input confirming selection of a presented deal, providing, by the application, information to the system regarding the selected deal, wherein a transaction associated with the deal is completed, and wherein at least a portion of the bonus points were applied to select the deal;
receiving, via the application, a redeemable representation of authorization information associated with the selected deal; and
transmitting, to a second user device via a text message, the redeemable representation of the authorization information.

14. The method of claim 13, wherein the redeemable representation of the authorization information is a QR code.

15. The method of claim 14, wherein the application is configured to be toggled into a mode associated with use by the particular entity, and wherein the mode is configured to enable scanning of the QR code by a second user device used by the particular entity.

16. The method of claim 13, wherein confirming selection of a presented deal comprises:
receiving, via the application, user input confirming selection of the presented deal, the presented deal being associated with a particular cost, wherein the portion of the bonus points are used to reduce the particular cost.

* * * * *